United States Patent
Betrisey et al.

(10) Patent No.: US 6,360,023 B1
(45) Date of Patent: Mar. 19, 2002

(54) ADJUSTING CHARACTER DIMENSIONS TO COMPENSATE FOR LOW CONTRAST CHARACTER FEATURES

(75) Inventors: Claude Betrisey, Redmond; Bodin Dresevic; John C. Platt, both of Bellevue, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/565,217

(22) Filed: May 5, 2000

Related U.S. Application Data

(63) Continuation of application No. 09/364,647, filed on Jul. 30, 1999.

(51) Int. Cl.[7] .............................................. G06F 15/00
(52) U.S. Cl. ...................................... 382/260; 382/266
(58) Field of Search ................................. 382/260–269; 358/462, 1.9

(56) References Cited

U.S. PATENT DOCUMENTS

| 4,136,359 A | 1/1979 | Wozniak | 358/17 |
| 4,217,604 A | 8/1980 | Wozniak | 358/16 |
| 4,278,972 A | 7/1981 | Wozniak | 340/703 |

(List continued on next page.)

FOREIGN PATENT DOCUMENTS

| EP | 0640934 A2 | * | 3/1995 |
| JP | 6-149199 | * | 3/1995 |

OTHER PUBLICATIONS

Abram, G. et al. "Efficient Alias–free Rendering using Bit–masks and Look–Up Tables" *San Francisco,* vol. 19, No. 3, 1985 (pp. 53–59).

Ahumada, A.J. et al. "43.1: A Simple Vision Model for Inhomogeneous Image–Quality Assessment" *1998 SID.*

Barbier, B. "25.1: Multi–Scale Filtering for Image Quality on LCD Matrix Displays" *SID 96 Digest.*

Barten, P.G.J. "P–8: Effect of Gamma on Subjective Image Quality" *SID 96 Digest.*

Beck. D.R. "Motion Dithering for Increasing Perceived Image Quality for Low–Resolution Displays" *1998 SID.*

Bedford–Roberts, J. et al. "10.4: Testing the Value of Gray–Scaling for Images of Handwriting" *SID 95 Digest,* pp. 125–128.

(List continued on next page.)

*Primary Examiner*—Thomas D. Lee
*Assistant Examiner*—Stephen Brinich
(74) *Attorney, Agent, or Firm*—Workman, Nydegger & Seeley

(57) ABSTRACT

Methods and systems for increasing the contrast with which thin-stemmed characters can be displayed in sub-pixel rendering processes are disclosed. Some fonts, such as Courier New, have relatively thin stems and other character features that would otherwise be rendered with low contrast when displayed using an oversampling process combined with a rendering process that treats individual pixel sub-components as separate luminous intensity sources. In order to avoid such low contrast features and to avoid the need for revising the font itself, the alpha values for the pixel sub-components that correspond to the character features are selectively increased to simulate larger dimensions of the character features and to increase the contrast with which the character dimensions are displayed. The methods involve oversampling image data representing a character by obtaining multiple samples for each of a plurality of pixel sub-components of a pixel. The alpha values associated with pixel sub-components at or near the position of the character features are increased to give the appearance of larger dimensions of the character features and greater contrast in the displayed image.

35 Claims, 13 Drawing Sheets

U.S. PATENT DOCUMENTS

| | | | |
|---|---|---|---|
| 5,057,739 A | 10/1991 | Shimada et al. | 313/477 R |
| 5,122,783 A | 6/1992 | Bassetti, Jr. | 340/701 |
| 5,254,982 A | 10/1993 | Feigenblatt et al. | 345/148 |
| 5,298,915 A | 3/1994 | Bassetti, Jr. et al. | 345/149 |
| 5,315,382 A * | 5/1994 | Tanioka | 358/523 |
| 5,334,996 A | 8/1994 | Tanigaki et al. | 345/152 |
| 5,341,153 A | 8/1994 | Benzschawel et al. | 345/152 |
| 5,349,451 A | 9/1994 | Dethardt | 358/518 |
| 5,467,102 A | 11/1995 | Kuno et al. | 345/1 |
| 5,543,819 A | 8/1996 | Farwell et al. | 345/150 |
| 5,548,305 A | 8/1996 | Rupel | 345/150 |
| 5,555,360 A | 9/1996 | Kumazaki et al. | 395/143 |
| 5,633,654 A | 5/1997 | Kennedy, Jr. et al. | 345/114 |
| 5,689,283 A | 11/1997 | Shirochi | 345/132 |
| 5,767,837 A | 6/1998 | Hara | 345/152 |
| 5,821,913 A | 10/1998 | Mamiya | 345/88 |
| 5,847,698 A | 12/1998 | Reavey et al. | 345/173 |
| 5,889,885 A * | 3/1999 | Moed et al. | 382/172 |
| 5,894,300 A | 4/1999 | Takizawa | 345/115 |
| 5,896,136 A * | 4/1999 | Augustine et al. | 345/431 |
| 5,949,643 A | 9/1999 | Batio | 361/681 |
| 5,963,185 A | 10/1999 | Havel | 345/83 |
| 6,040,818 A * | 3/2000 | Minami et al. | 345/147 |

OTHER PUBLICATIONS

Chen, L.M. et al. "Visual Resolution Limits for Color Matrix Displays" *Displays—Technology and Applications,* vol. 13, No. 4, 1992, pp. 179–186.

Cordonnier, V. "Antialiasing Characters by Pattern Recognition" *Proceedings of the S.I.D.* vol. 30, No. 1, 1989, pp. 23–28.

Cowan, W. "Chapter 27, Displays for Vision Research" *Handbook of Optics, Fundamentals, Techniques & Design,* Second Edition, vol. 1, pp. 27.1–27.44.

Crow, F.C. "The Use of Grey Scale for Improved Raster Display of Vectors and Characters" *Computer Graphics,* vol. 12, No. 3, Aug. 1978, pp. 1–5.

Feigenblatt, R.I., "Full–color Imaging on amplitude–quantized color mosaic displays" *Digital Image Processing Applications SPIE* vol. 1075 (1989) pp. 199–205.

Gille, J. et al. "Grayscale/Resolution Tradeoff for Text: Model Predictions" *Final Report,* Oct. 1992–Mar. 1995.

Gould, J.D. et al. "Reading From CRT Displays Can Be as Fast as Reading From Paper" *Human Factors,* vol. 29 No. 5, pp. 497–517, Oct. 1987.

Gupta, S. et al. "Anti–Aliasing Characters Displayed by Text Terminals" *IBM Technical Disclosure Bulletin,* May 1983 pp. 6434–6436.

Hara, Z. et al. "Picture Quality of Different Pixel Arrangements for Large–Sized Matrix Displays" *Electronics and Communications in Japan,* Part 2, vol. 77, No. 7, 1974, pp. 105–120.

Kajiya, J. et al. "Filtering High Quality Text For Display on Raster Scan Devices" *Computer Graphics,* vol. 15, No. 3, Aug. 1981, pp. 7–15.

Kato, Y. et al. "13:2 A Fourier Analysis of CRT Displays Considering the Mask Structure, Beam Spot Size, and Scan Pattern" (c) *1998 SID.*

Krantz, J. et al. "4:5: Color Matrix Display Image Quality: The Effects of Luminance and Spatial Sampling" *SID 90 Digest,* pp. 29–32.

Kubala, K. et al. "27:4: Investigation Into Variable Addressability Image Sensors and Display Systems" *1998 SID.*

Mitchell, D.P. "Generating Antialiased Images at Low Sampling Densities" *Computer Graphics,* vol. 21, No. 4, Jul. 1987, pp. 65–69.

Mitchell, D.P. et al., "Reconstruction Filters in Computer Graphics", *Computer Graphics,* vol. 22, No. 4, Aug. 1998, pp. 221–228.

Morris R.A., et al. "Legibility of Condensed Perceptually–tuned Grayscale Fonts" *Electronic Publishing, Artistic Imaging, and Digital Typography,* Seventh International Conference on Electronic Publishing, Mar. 30–Apr. 3, 1998, pp. 281–293.

Murch, G. et al. "7.1: Resolution and Addressability: How Much is Enough?" *SID 85 Digest,* pp. 101–103.

Naiman, A., "Some New Ingredients for the Cookbook Approach to Anti–Aliased Text" *Proceedings Graphics Interface 81,* Ottawa, Ontario, May 28–Jun. 1, 1984, pp. 99–108.

Naiman, A, et al. "Rectangular Convolution for Fast Filtering of Characters" *Computer Graphics,* vol. 21, No. 4, Jul. 1987, pp. 233–242.

Naiman, A.C. "10:1 The Visibility of Higher–Level Jags" *SID 95 Digest* pp. 113–116.

Peli, E. "35.4: Luminance and Spatial–Frequency Interaction in the Perception of Contrast" *SID 96 Digest.*

Pringle, A., "Aspects of Quality in the Design and Production of Text", *Association of Computer Machinery* 1979, pp. 63–70.

Rohellec, J. Le et al. "35.2: LCD Legibility Under Different Lighting Conditions as a Function of Character Size and Contrast" *SID 96 Digest.*

Schmandt, C. "Soft Typography Information Processing 80", *Proceedings of the IFIP Congress* 1980, pp. 1027–1031.

Sheedy, J.E. et al. "Reading Performance and Visual Comfort with Scale to Grey Compared with Black–and–White Scanned Print" *Displays,* vol. 15, No. 1, 1994, pp. 27–30.

Sluyterman, A.A.S. "13:3 A Theoretical Analysis and Empirical Evaluation of the Effects of CRT Mask Structure on Character Readability" (c) *1998 SID.*

Tung. C., "Resolution Enhancement Technology in Hewlett–Packard LaserJet Printers" *Proceedings of the SPIE—The International Society for Optical Engineering,* vol. 1912, pp. 440–448.

Warnock, J.E. "The Display of Characters Using Gray Level Sample Arrays", *Association of Computer Machinery,* 1980, pp. 302–307.

Whitted, T. "Anti–Aliased Line Drawing Using Brush Extrusion" *Computer Graphics,* vol. 17, No. 3, Jul. 1983, pp. 151,156.

Yu, S., et al. "43:3 How Fill Factor Affects Display Image Quality" (c) *1998 SID.*

"Cutting Edge Display Technology—The Diamond Vision Difference" www.amasis.com/diamondvision/technical.html, Jan. 12, 1999.

"Exploring the Effect of Layout on Reading from Screen" http://fontweb/internal/repository/research/explore.asp?RES=ultra 10 pages, Jun. 3, 1998.

"How Does Hinting Help?" http://www.microsoft.com/typography/hinting/how.htm/fname=%20&fsize Jun. 30, 1997.

"Legibility on screen: A report on research into line length, document height and number of columns" http://fontweb/internal/repository/research/scrnlegi.asp?RES=ultra Jun. 3, 1998.

"The Effect of Line Length and Method of Movement on reading from screen" http://fontweb/internal/repository/research/linelength.asp?RES=ultra 20 pages, Jun. 3, 1998.

"The Legibility of Screen Formats: Are Three Columns Better Than One?" http://fontweb/internal/repository/research/scrnformat.asp?RES=ultra 16 pages, Jun. 3, 1998.

"The Raster Tragedy at Low Resolution" http://www.microsoft.com/typography/tools/trtalr.htm?fname=%20&fsize.

"The TrueType Rasterizer" http://www.microsoft.com/typography/what/raster.htm?fname=%20&fsize Jun. 30, 1997.

"TrueType fundamentals" http://www.microsoft.com/OTSPEC/TTCHO1.htm?fname=%20&fsize Nov. 16, 1997.

"True Type Hinting" http://www.microsoft.com/typography/hinting/hinting.htm Jun. 30, 1997.

"Typographic Research" http://fontweb/internal/repository/research/research2.asp?RES=ultra Jun. 3, 1998.

* cited by examiner

IMAGE BLOATING RULE TABLE — 1700

| INTERMEDIATE α VALUE BEFORE BLOATING | INTERMEDIATE α VALUE AFTER BLOATING |
|---|---|
| 1 | 2 |
| 2 | 2 |
| 0 NEXT TO A 2 | 1 |
| 0 NOT NEXT TO A 2 | 0 |

FIG. 13

ADJUSTING CHARACTER DIMENSIONS TO COMPENSATE FOR LOW CONTRAST CHARACTER FEATURES

RELATED APPLICATIONS

This application is a continuation of U.S. patent application Ser. No. 09/364,647, entitled "Method and Apparatus for Filtering and Caching Data Representing Images," and filed Jul. 30, 1999, which is incorporated herein by reference.

BACKGROUND OF THE INVENTION

1. The Field of the Invention

The present invention relates to display methods and apparatus and, more particularly, to methods and apparatus for improving the contrast with which relatively small-dimension character features are displayed on display devices which have multiple separately controllable luminance elements per pixel.

2. The Prior State of the Art

The display of images, e.g., text characters, on display devices is of high importance. This is particularly the case given the ever increasing use of computers and other types of devices which rely on displays to convey information. Pixels are used to represent display images on a display device. The term pixel, which is short for picture-element, is commonly used to refer to one spot in, e.g., a rectangular grid of thousands of spots which can be used to represent an image. Pixels are normally used individually by a computer to form an image on the display device.

Color display devices have become the principal display devices of choice for most computer users. The display of color on a monitor is normally achieved by operating the display device to emit light, e.g., a combination of red, green, and blue light, which results in one or more colors being perceived by a human viewer.

In color displays, the intensity of the light emitted corresponding to the additive primary colors, red, green and blue, can be varied to get the appearance of almost any desired color pixel. Adding no color, i.e., emitting no light, produces a black pixel. Adding 100 percent of all three colors results in white.

In cathode ray tube (CRT) display devices, the different colors of light are generated via the use of phosphor coatings which may be applied as dots in a sequence on the screen of the CRT.

Liquid crystal displays (LCDs), or other flat panel display devices are commonly used in portable computer devices in the place of CRTs. This is because flat panel displays tend to be small and lightweight in comparison to CRT displays. In addition flat panel displays tend to consume less power than comparable sized CRT displays making them better suited for battery powered applications than CRT displays.

As the quality of flat panel color displays continues to increase and their cost decreases, flat panel displays are beginning to replace CRT displays in desktop applications. Accordingly, flat panel displays, and LCDs in particular, are becoming ever more common.

Unlike CRT displays, LCD displays use square or rectangular light emitters, usually positioned adjacent one another, as the source of red, green and blue light for each pixel. Due to manufacturing limitations with regard to the size of light emitters in LCD displays, it is difficult in an LCD display to achieve the same resolution commonly found in CRT displays.

Unfortunately, the limited resolution provided by commonly used flat panel displays such as LCDs tends to be less than ideal for the display of text. LCD display resolution problems are particularly noticeable when displaying text at small font sizes which are commonly used on personal data assistants and other hand held devices. When the size of a pixel is treated as the smallest unit of size which can be used to represent a position of a character or other image, the relatively large pixel size compared to the character size tends to produce characters with jagged edges.

The use of LCD displays with small characters can also produce less than desirable representations of, e.g., bold text. In the case of bold text it is desirable that bold character stems have stem weights that are 10–20% higher than the corresponding non-bold character stem. At small sizes a character stem may be only one or two pixels in width. Given such stem widths, adjustments in stem weights in one pixel size increments as is commonly done in the art, can lead to far more than the desired 10–20 percent increase in stem weight for bold characters.

FIG. 1 illustrates a known computer system 100 which comprises a housing 101, keyboard 104, disk drive 105 and an LCD display 102. The LCD display comprises a plurality of pixels, two of which are identified by reference numbers 110, 112. Each of the pixels 110, 112 includes separate red (R), green (G) and blue (B) pixel subcomponents which may be controlled as independent luminous intensity sources. In the computer system 100, the R, G and B pixel subcomponents are arranged to for vertical stripes.

In known systems, in the case of text, a high resolution representation of a text character, sometimes referred to as an analytic representation, is normally sampled. The samples are then used to generate luminous intensity values, e.g., red, green and blue pixel sub-component luminous intensity values, which control the light output of the R, G and B pixel sub-components of each pixel, respectively. In conventional systems, the R, G, and B pixel sub-component luminous intensity values are normally generated from the same set of image samples.

FIG. 2 illustrates one known image rendering technique used to control the light output of a set of pixels. In FIG. 2, the grid 220 represents a source image, e.g., a foreground/background color representation of a text character, which has been divided into segments corresponding to 3 rows R(N), R(N+1), R(N+2) and 3 columns C(N), C(N+1), C(N+2) of source image pixel segments. Each one of the 9 segments corresponds directly to one pixel, e.g., pixel 240, of the display screen represented by grid 230. Red, green and blue pixel sub-components 232, 234, 236 are illustrated in FIG. 2 using medium, dark and light speckling, respectively.

In the known image rendering technique, each portion of a source image corresponding to a pixel, referred to herein as a source image pixel segment, is oversampled by a factor of 4 in the vertical and horizontal dimensions. Thus, a set of 16 samples, represented by the circles 222 with x's inside, is generated for each pixel.

The 16 samples corresponding to each pixel segment are then filtered to produce the red, green and blue luminous intensity values used to control pixel sub-components 232, 234, 236. The filtering of the samples is represented by the arrow extending from source image segment 223 to pixel 240. Thus, in the illustrated system, the same portion of the source image is used to generate each of the red, green and blue pixel sub-component luminous intensity values of a pixel. In the known FIG. 2 system, the filtering performed to generate pixel sub-component luminous intensity values does not cross pixel boundaries indicated in the image 220 by the use of solid lines. Accordingly, the luminous intensity of each pixel is not affected by neighboring source image pixel segments. As will be discussed below, this allows different images, e.g., text characters, to be sampled, filtered, stored and then subsequently concatenated without impacting the filtering since the filtering does not depend on neighboring image portions beyond a pixel boundary.

As is known in the art, there are generally two stages associated with the display of text images, e.g., characters, 1) the glyph rendering stage and 2) the glyph display phase. The glyph rendering stage involves the generation of one or more character glyphs and the storage of the glyphs in a glyph cache for subsequent use, e.g., during the display phase. The glyph display phase involves retrieving glyphs from the font cache as need, and, in many cases, combining them prior to display to form text strings.

In the glyph rendering stage one or more character glyphs are rendered, i.e., generated, from corresponding high resolution representations, e.g., outline representations, of the rendered characters. The high resolution character representations from which characters are frequently rendered include character shape and size information. The shape information is frequently in the form of lines, points, curves and/or arcs. Areas within the character outline correspond to the foreground color while areas outside the character outline correspond to the background color.

As part of one known character glyph rendering process, the high resolution representation of the character image from which the glyph is being generated, is sampled multiple times per pixel in both the horizontal and vertical directions as illustrated in FIG. 2. The samples corresponding to each pixel of an image are then filtered, e.g., summed, to perform a filtering operation. The value associated with each pixel resulting from the filtering operation is then stored, along with character spacing information, in a font glyph cache. In the known system one value, referred to as an alpha value, is generated per pixel as a result of the filtering operation.

Alpha values indicate the proportion of the foreground and the background color which contribute to the image area to which the alpha value corresponds. In the known system a single alpha value is generated for each pixel and is used to control the red, green and blue luminous intensity values of the pixel as a function of foreground and background colors which are subsequently applied.

Alpha values are usually normalized to a value in the range of 0–1 before being used in the application of foreground/background colors to a rendered character glyph. In the known system a normalized alpha value of 1 indicates that the region to which the alpha value corresponds is a foreground color region. A normalized alpha value of 0.5 indicates that the foreground and background colors contribute equally to the color of the region corresponding to the alpha value. In addition, a normalized alpha value of 0 indicates that the region to which the alpha value corresponds is a background color region.

In the known system, rendered glyphs, which S include character spacing information and one alpha value per pixel, are stored in a glyph cache. The stored alpha values are non-normalized values which are generated by summing the individual samples, having a value of 0 or 1, corresponding to a pixel region.

By storing rendered glyphs in a glyph cache, the known system avoids the need to render a character glyph each time it needs to be displayed, e.g., as part of a text string.

The second phase of rendering text, the glyph display phase, involves reading out glyphs from the glyph cache, applying foreground/background color selections, a gamma correction operation and then outputting the resulting values to a display buffer for storage until being used to control the display device to display the desired character images.

The above described process can be used to generate and display opaque or transparent characters. In the case of opaque characters, a uniform background color is applied. In the case of transparent characters, the background color may vary as a function of the background image over which the characters are placed.

FIG. 3 illustrates one known embodiment of the above described glyph rendering and displaying process as applied to rendering and displaying opaque characters. In FIG. 3, and the various other process diagrams included in the present application, ovals are used to illustrate steps, rectangles are used to illustrate hardware devices, e.g., storage devices, and non-rectangular parallelograms are used to represent data, information, or other values.

The known process 300 begins in step 302 with the sampling of source image pixel segments of a character image. The pixel segments are sampled at a rate of 4× in both the horizontal and vertical directions 15 as illustrated in FIG. 2. The image samples (16 per pixel) 304 are then filtered in step 306 using a box filter to produce a value between 0 and 16 per pixel. Next in step 308, values of 16 are clipped to 15 so that the alpha value for each pixel can be represented using 4 bits. This permits the alpha values to range between 0–15 and allows the alpha values to be stored using 4 bits each as opposed to 5 bits which would be needed for the range 0–16. The alpha values produced by clipping step 308, on per pixel, are stored in the font glyph cache 310 as a glyph corresponding to the sampled image. Multiple character glyphs may be stored in the font glyph cache 310.

The glyph display phase of display text begins with glyphs being output by the glyph cache 310. The output of glyphs is in response to a glyph identifier which identifies the stored glyph to be output.

The alpha values, one per pixel, included in the output glyphs are processed to apply selected foreground and background colors in blending step 312. As part of step 312, the alpha values are normalized to a value between 0 and 1. Foreground and background colors are then applied, to generate R, G, and B luminous intensity values, on a per pixel according to the following equation:

$$R = \alpha R_F + (1-\alpha) R_B$$

$$G = \alpha G_F + (1-\alpha) G_B$$

$$B = \alpha B_F + (1-\alpha) B_B$$

Note that foreground and background colors are specified as gamma corrected values, i.e., values which have been processed to take into consideration the non-linear response characteristics of a display device. Before use in the color blending operation 312, the gamma corrected foreground and background colors are inverse gamma corrected in steps 311 and 312 to produce the foreground and background luminous intensity values used in the color blending process.

The R, G, B foreground and background luminous intensity values used for blending are indicated through the use of an F subscript for a foreground value and a B subscript for a background value.

The generated luminous intensity values are gamma corrected in step 314 prior to being stored in the display buffer 316. Gamma correction is a well known process for adjusting luminous intensity values to take into consideration the non-linear nature of the light output of a display device in response to voltage control signals.

FIG. 4 illustrates another embodiment of the known process for rendering and displaying opaque glyphs. In the FIG. 4 process 400, a pre-computed look-up table 402 is used to perform a combined color application and gamma correction procedure. A different look-up table 402 is used for each supported set of foreground/background colors. The look-up table 402 receives as its input one four bit alpha value per pixel and outputs one set of R, G, B values for each alpha value supplied thereto.

FIG. 5 illustrates a known process 500 for rendering and displaying transparent glyphs. In the FIG. 5 embodiment, gamma correction is performed in the alpha color space in step 502 on the alpha values output by the font glyph cache 310. The gamma corrected alpha values are then supplied to compositing step 504. Since gamma correction is performed in alpha space inverse gamma correction operations need not be performed on the foreground/background color values prior to color blending. Compositing step 504 is responsible for performing color blending using a fixed foreground color and a background color obtained from a background image. Accordingly, in the process 500, background image data is retrieved, on a per pixel basis, from the display buffer 516 in compositing step 504 for color blending purposes. The background information is retrieved from the pixel location in the display buffer 516 corresponding to the image location of the pixel being prepared for display. The R, G, B luminance values produced for each pixel are stored in the display buffer 516 at locations indicated by the glyph location information supplied to compositing step 504.

While the known text display methods work satisfactorily in many applications, as discussed above, in the case of LCD displays and small display sizes, images can suffer from blur, jaggedness, and other problems due to a lack of resolution. This is due, in part, to the fact that pixels are treated as single entities in most known image display processes. In view of the above remarks, it is apparent that there is a need for new and improved display methods and apparatus. It is desirable that at least some of the new methods and apparatus be capable of displaying small size text on LCDs at reasonable quality levels. It is also desirable that some of the new methods and apparatus be capable of displaying text in a computationally efficient manner allowing for the use of lower cost processors than might otherwise be required.

SUMMARY OF THE INVENTION

The present invention relates to methods and apparatus for displaying images, e.g., text characters, on display devices which have multiple separately controllable luminance elements per pixel.

In accordance with the present invention, pixel sub-components are treated as individual luminous intensity sources which can be separately controlled to represent different portions of a source image. As part of the display process of the present invention, high resolution representations of images, e.g., outline representations of text characters to be displayed, are super-sampled. Sets of samples corresponding to different but potentially overlapping image portions are then used to control the light output of individual pixel sub-components of each pixel. The samples, in the set of samples used to control each pixel sub-component are filtered, e.g., summed, to generate a filtered alpha value corresponding to a pixel sub-component. In this manner, a set of filtered alpha values, one for each pixel sub-component of a pixel is generated.

Foreground and background color is applied to each pixel sub-component through the use of alpha blending techniques.

Methods and apparatus for efficiently darkening characters which may otherwise appear too light or gray, due to thin stem widths, are described herein. The described methods involve bloating character images of particular fonts with which the gray problem due to thin stems is associated. The bloating operation may be selectively implemented as part of a filtering look-up table operation. Such an approach to resolving the gray character problem avoids the need to modify hinting rules or modify the character font file from which the character images are generated.

Additional features, embodiments and benefits of the methods and apparatus of the present invention are discussed in the detailed description which follows.

BRIEF DESCRIPTION OF THE DRAWINGS

FIG. 13 illustrates an image bloating rule table of the present invention.

DETAILED DESCRIPTION OF THE INVENTION

As discussed above, the present invention is directed to methods and apparatus for displaying images, e.g., text, on display devices which have multiple controllable luminance elements, e.g., pixel sub-components, per pixel.

The present invention treats pixel sub-components as independent luminous intensity sources which may be used to represent an image. In accordance with the present invention, different portions of a source image, e.g., a high resolution representation of a text character, are used to control different pixel sub-components of a pixel. In this manner, improved resolution is achieved when displaying images with separately controllable pixel sub-components. While using different portions of a source image to control each pixel sub-component of a pixel may introduce some color errors since humans are considerably more sensitive to light intensity than color, the trade off between increased resolution at the expense of decreased color accuracy can provide significant display benefits. The benefits are particularly noticeable when displaying text at small sizes which is frequently the case in hand-held devices and portable computer applications.

I. Exemplary Sampling and Filtering Methods

Figure 6:
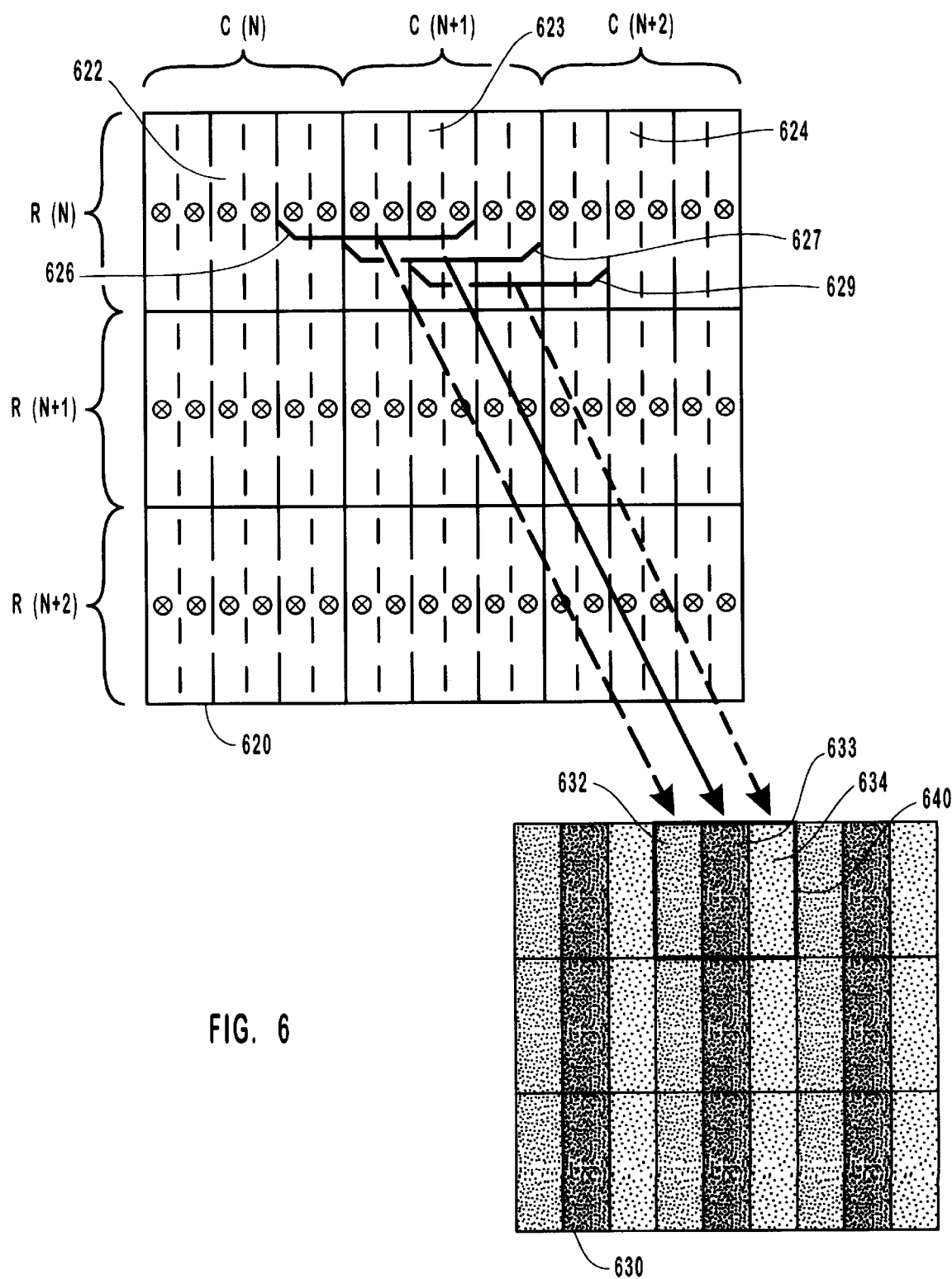
FIG. 6 illustrates a method of sampling and filtering images in accordance with an exemplary embodiment of the present invention.

FIG. 6 illustrates an exemplary image sampling and filtering method, used in accordance with one embodiment of the present invention. The sampling and filtering process illustrated in FIG. 6 is suitable for use with RGB striped displays, such as the vertically striped display represented by grid 630. In grid 630 dark solid lines are used to represent pixel boundaries while lighter solid lines are used to represent pixel sub-component boundaries. Red, green and blue pixel sub-components 632, 633, 636 of pixel 640 are illustrated in FIG. 6 using medium, dark and light speckling, respectively.

In FIG. 6, the grid 620 represents a source image, e.g., a scaled, hinted, foreground/background color representation of a text character. The source image 620 has been divided into 9 segments source image pixel segments corresponding to 3 rows R(N), R(N+1), R(N+2) and 3 columns C(N), C(N+1), C(N+2). The three segments in row (N) are identified by reference numerals 622, 623, 624. Each one of the 9 source image pixel segments is a source image portion which is proportional in size to one display pixel, e.g., pixel 640, of the display screen represented by grid 630. For purposes of illustration, each source image area is divided into three regions separated by long dashed lines used to represent the location of pixel sub-component boundaries in each source image pixel segment. Smaller dashed lines are used to divide each source image pixel sub-component segment into two sections for purposes of source image sampling.

In accordance with the present invention, each one of the source image segments 622, 623, 624 is over-sampled in the direction perpendicular to the RGB striping. In the FIG. 6 embodiment, the source image is over-sampled at a rate of 6× in the direction perpendicular to the striping, e.g., the horizontal direction, and at a rate of 1× in the direction parallel to the striping, e.g., the vertical direction. Thus, as illustrated in FIG. 6, 6 samples are generated per source image pixel area. Other sampling rates are also possible, e.g., sampling at 3n times in the horizontal direction and 1 times in the vertical direction could be used, where n is n is an integer, e.g., 2.

Figure 1:
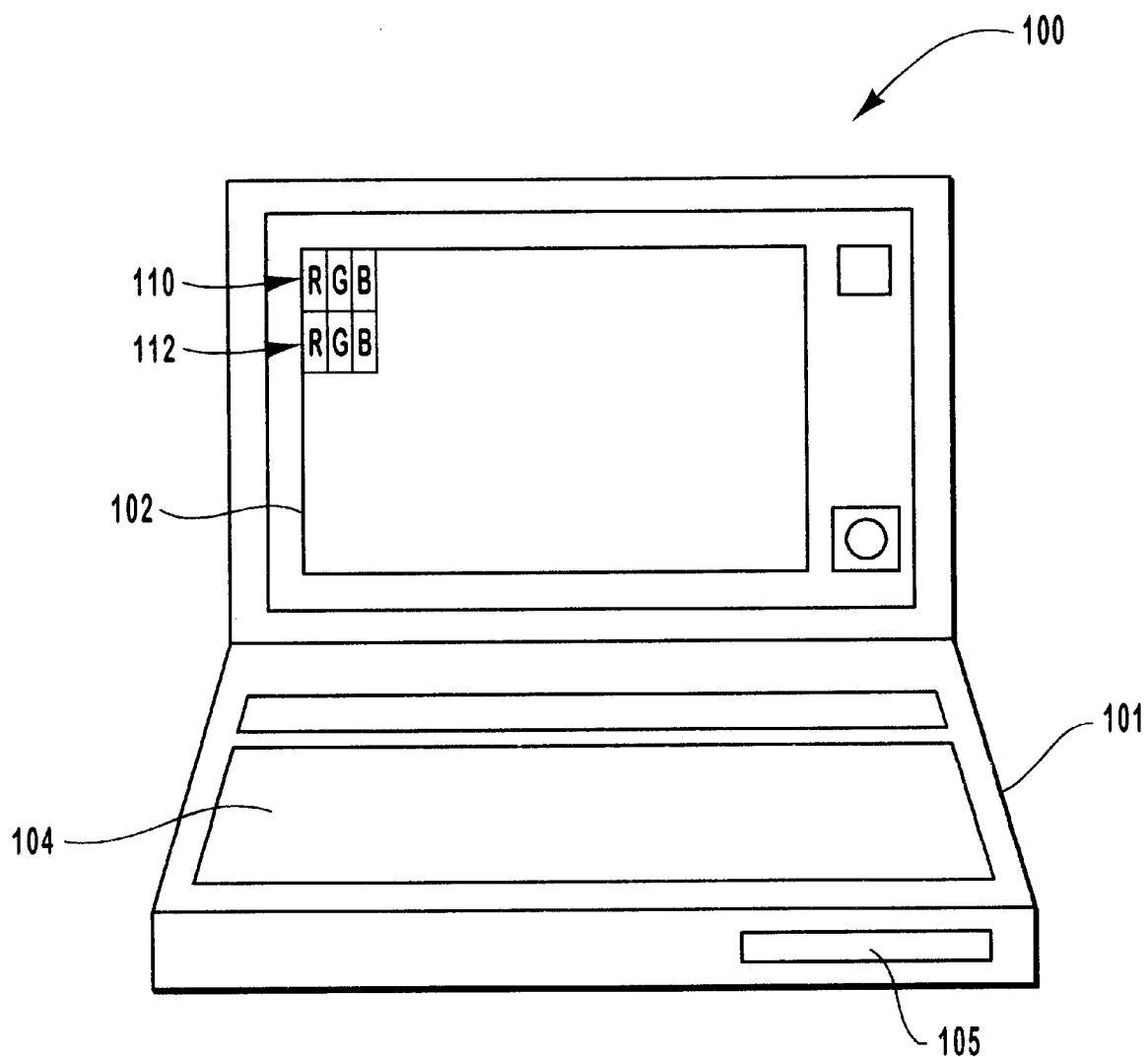
FIG. 1 illustrates a known portable computer including a striped LCD display.
Figure 2:
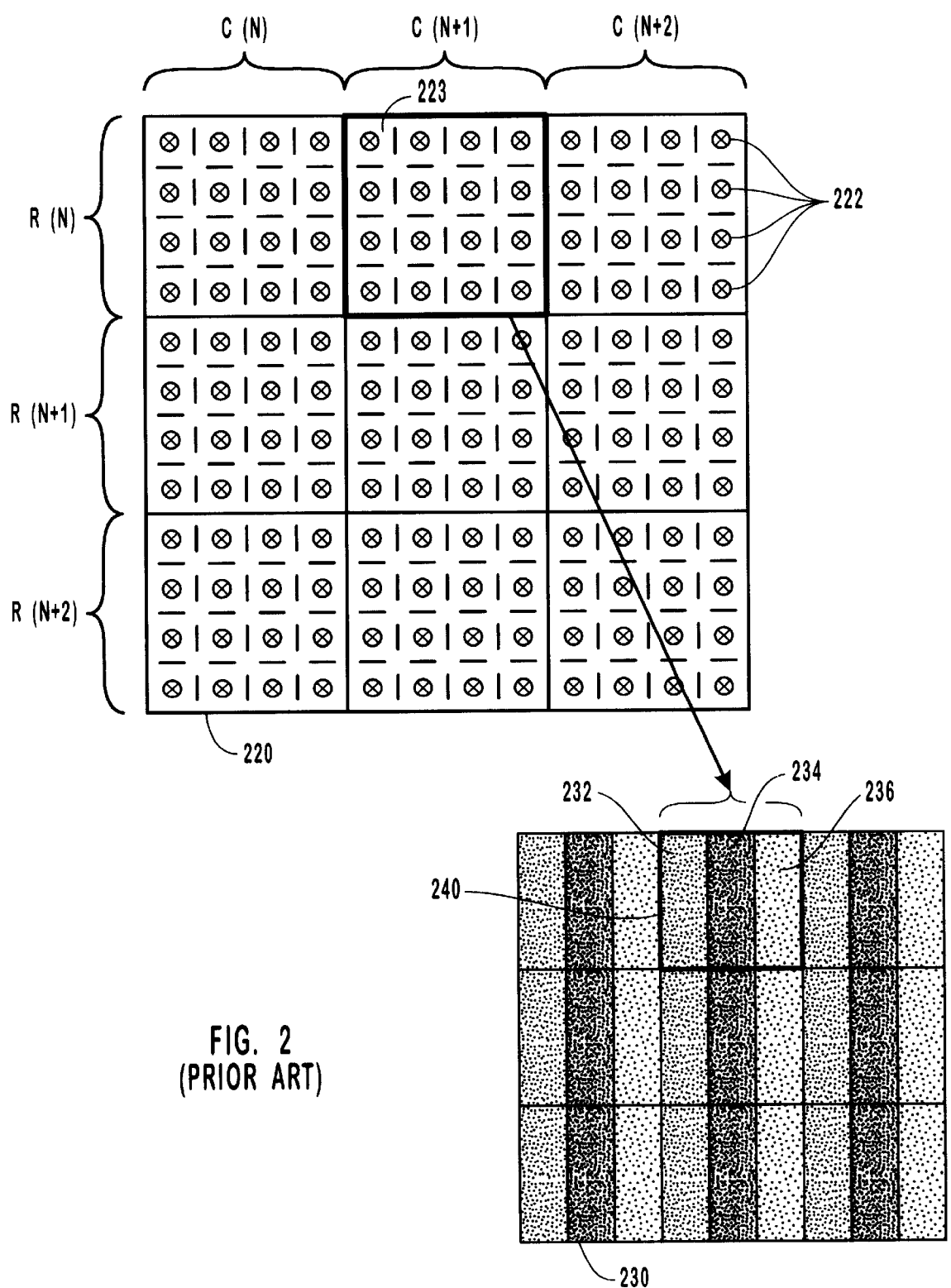
FIG. 2 illustrates a known image sampling method.
Figure 3:
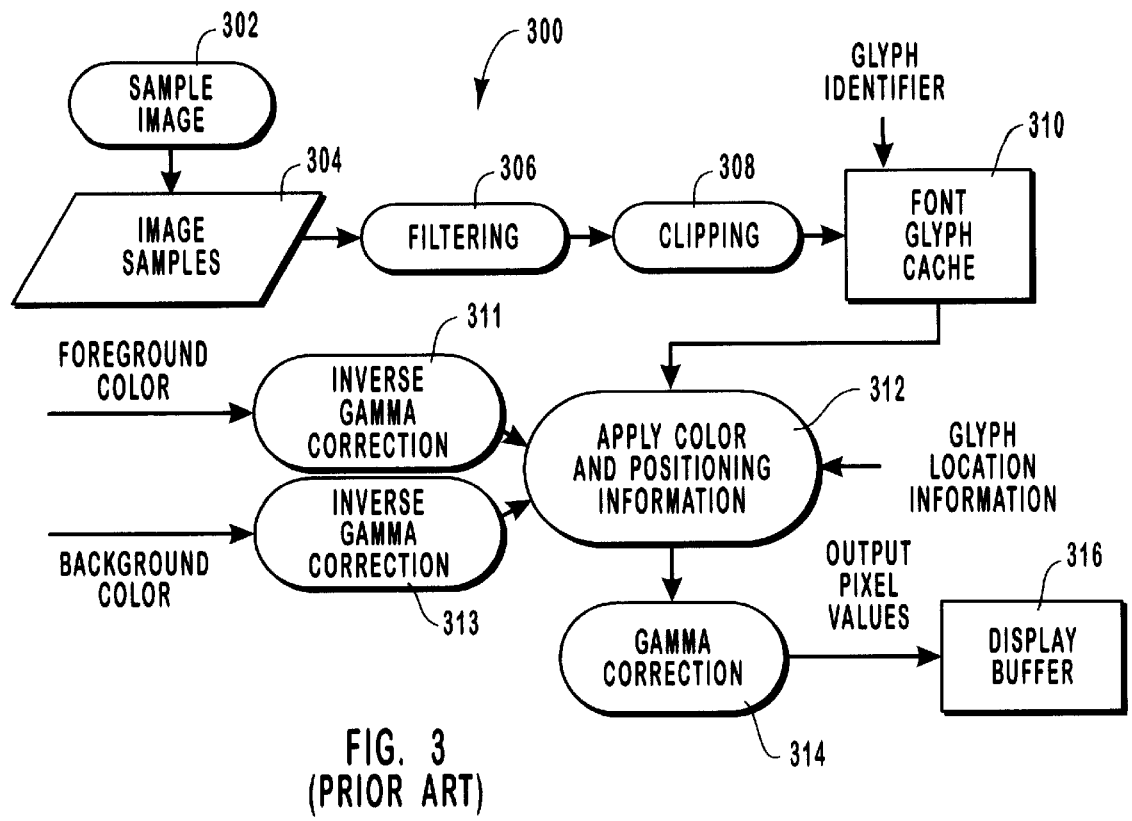
FIG. 3 illustrates a known process for rendering and displaying opaque glyphs.
Figure 4:
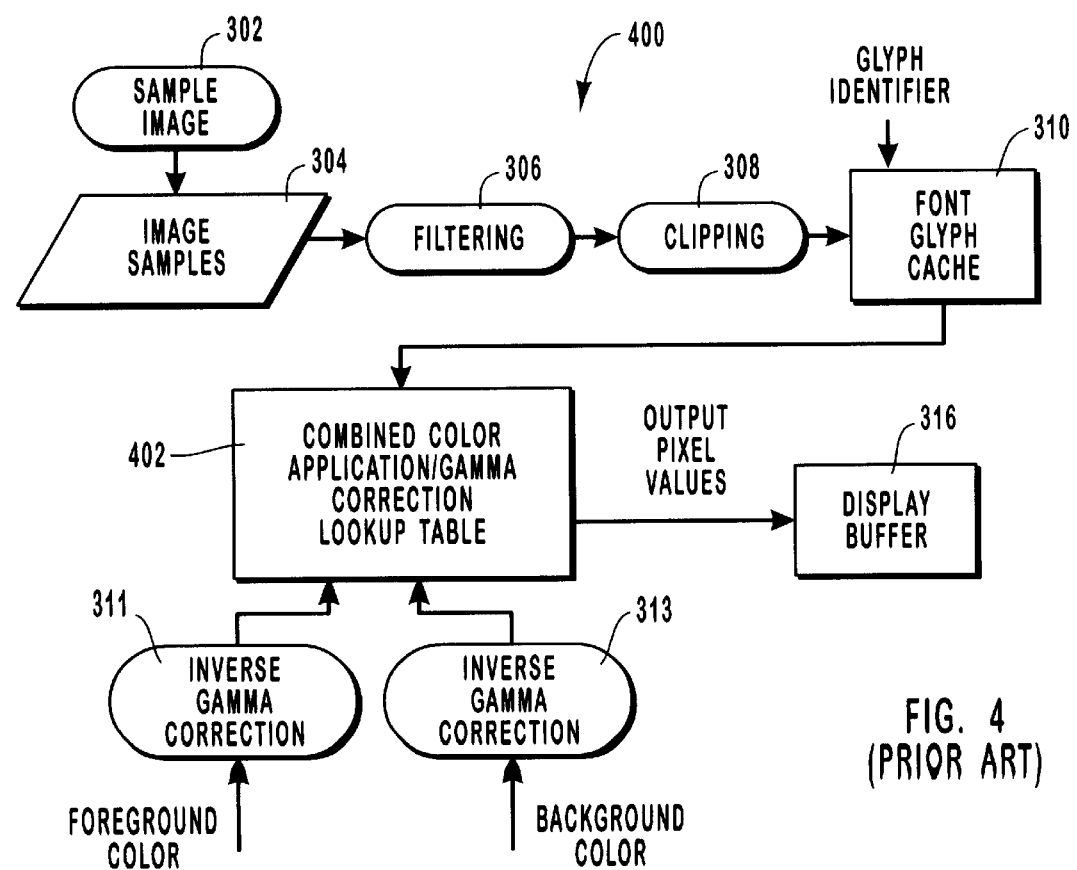
FIG. 4 illustrates a known process for rendering and displaying opaque glyphs which involves the use of a look-up table to perform both a color application and a gamma correction operation.
Figure 5:
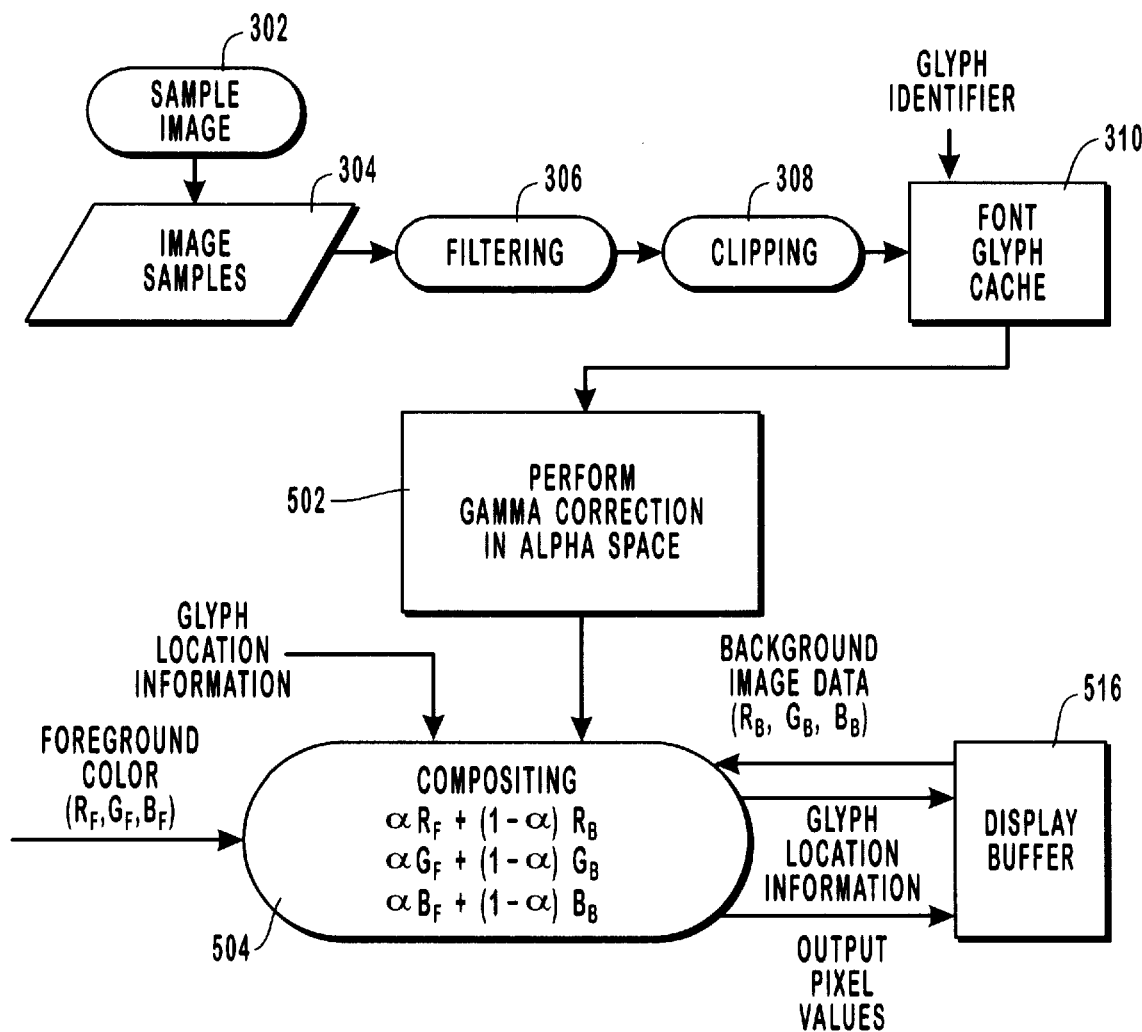
FIG. 5 illustrates a known process for rendering and displaying transparent glyphs.

Unlike the known image sampling and filtering process illustrated in FIG. 4, which uses the same set of samples to control each of the pixel sub-components of a pixel, the present invention uses different source image portions and thus sets of source image samples, to control each pixel sub-component of the display screen 630. For example, in the FIG. 6 embodiment, six samples centered horizontally about the location of each pixel sub-component to be controlled, are used to generate each pixel sub-component luminous intensity value. Since the centers of each of the red, green and blue pixel sub-components 632, 633, 634 are displaced from one another, the sets of samples used to control these pixel sub-components are also displaced from one another. Accordingly, the sampling and filtering techniques of the present invention used to generate pixel sub-component luminous intensity values may be described as displaced sampling with filtering.

In FIG. 6, the brackets 626, 627, 629 and arrows extending therefrom represent the filtering of image samples to produce a value used to control the pixel sub-component to which the arrow leads. For example, in the FIG. 6 illustration, bracket 626, and the arrow leading therefrom, is used to indicate the filtering of the 6 samples used to control the red pixel sub-component 632. Bracket 627 and the arrow leading therefrom is used to indicate the filtering of the 6 samples used to control the green pixel sub-component 632. In addition, bracket 629, and the arrow leading therefrom, is used to indicate the filtering of the 6 samples used to control the blue pixel sub-component 632. In accordance with the present invention, the filtering may be a simple box filtering operation implemented, e.g., by summing the value of the six samples being filtered.

FIGS. 7–10 further illustrate an exemplary oversampling and filtering operation that is presented in preparation for later describing the methods of the invention in which the foreground portions of character glyphs that tend to exhibit graying or a font contrast problem are slightly widened or "bloated".

Figure 7:
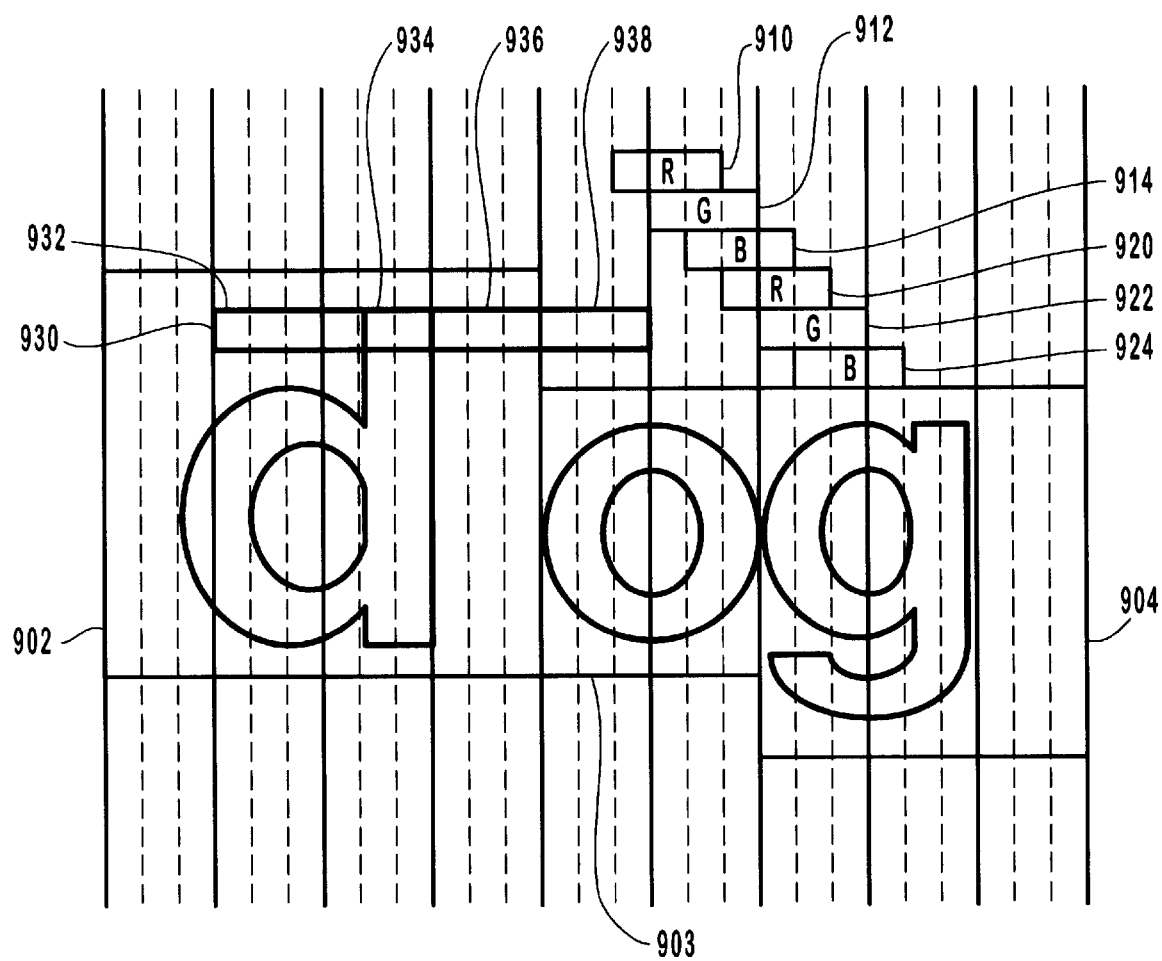
FIG. 7 illustrates sampling and filtering features of the present invention as applied to a text character string comprising three character images.

Consider the case of combining character glyphs corresponding to the letters d, o, g to form the word "dog" as illustrated in FIG. 7. In FIG. 7, box 902, represents the character glyph for the letter "d", box 903 represents the character glyph for the letter "o", and box 904 represents the character glyph for the letter "g". While the characters are shown in FIG. 7, each character glyph would, in actuality, be represented by a set of alpha values. Solid lines indicate pixel boundaries while dashed lines are used in FIG. 7 to indicate sub-pixel boundaries. Boxes 910, 912, 914 illustrate the horizontal location of the box filters used in accordance with the present invention to filter the alpha values used to generate the R, G, and B pixel sub-component luminous intensity values of a first pixel located along the left side of the vertical o-g glyph boundary. Box filters 910, 912, 914 are illustrated as being vertically displaced for purposes of illustration. In the exemplary embodiment, displacement of the box filters 910 through 924, which are used for horizontally adjacent image areas, occurs in the horizontal but not the vertical image direction. Box filters 920, 922, 924 are used for filtering a pixel located on the right side of a vertical o-g glyph boundary plane.

Note how the output of the red box filter 910 depends on the alpha values from the source image segment adjacent, and to the left of, the pixel image segment to which the red pixel sub-component corresponds. Also note how the output of the blue box filter 914 depends on the alpha values from the source image pixel segment to the right of the pixel image segment to which the blue pixel sub-component corresponds. In the case where character images are not separated horizontally by at least one pixel sub-component of background color space (equivalent to 2 samples in the case of over-sampling by 6), bleeding of the color from the neighboring character glyph into the adjacent character glyph will occur for pixels along the glyph boundary where the character images touch.

Figure 8:
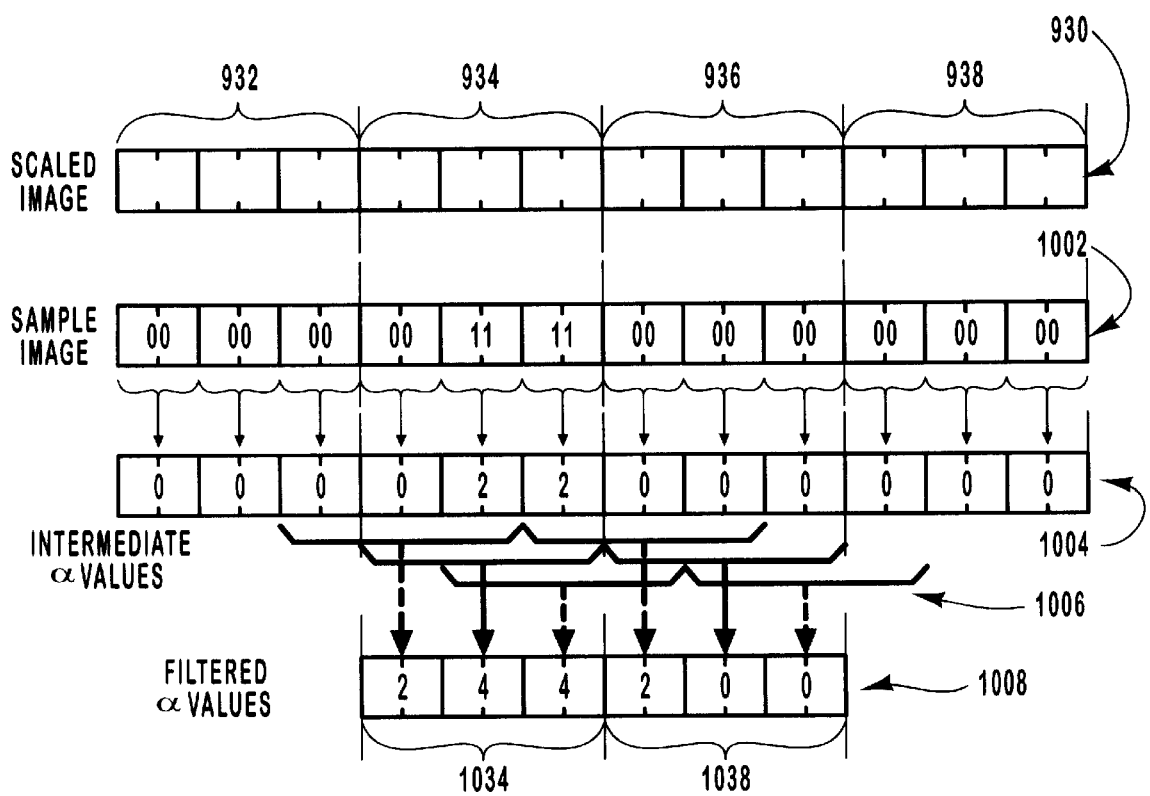
FIG. 8 illustrates the sampling and filtering of a portion of a text character illustrated in FIG. 7, in accordance with an exemplary embodiment of the present invention.

The effect of adjacent source image portions located across pixel boundaries, in the case of over-sampling by 6 and the use of box filters 6 samples wide, is apparent in the example shown in FIG. 8. FIG. 8 illustrates the application of sampling and filtering in accordance with the present invention, as applied to image segment 930 which includes four adjacent source image pixel segments 932, 934, 936, 938.

In accordance with the present invention, source image segments 932, 934, 936, 938 are each over-sampled by a factor of 6 to produce a set of 6 samples per source image pixel segment. Row 1002 of FIG. 8, illustrates, directly below each source image segment, the values of the samples obtained from the corresponding source image segments. For example, sample values (0,0,0,0,0,0) are obtained by sampling source image segments 932, 936 and 938 while sample values (0,0,1,1,1,1) are obtained by sampling source image segment 934.

In many embodiments, pairs of individual samples are summed to form a set of intermediate alpha values, 3 per source image pixel segment area. The summing of pairs of alpha values is done for purposes of computational and storage efficiency. It also permits the intermediate alpha values to be generated in a font driver while filtered alpha values are generated by the graphics display interface 801. The separation of the generation of the intermediate alpha values and filtered alpha values allows a font driver to be generated without concern or knowledge of how the GDI 801 generates filtered alpha values.

The intermediate alpha values corresponding to each source image pixel segment is shown in FIG. 8 in row 1004 directly below the corresponding source image pixel segment area. As illustrated intermediate alpha values (0,0,0) are generated from source image pixel segment areas 932, 936 and 938 while intermediate alpha values (0, 2, 2) are generated from source image pixel segment 934.

In accordance with the present invention, box filtering is applied to the intermediate alpha values as represented by the brackets generally indicated by reference numeral 1006.

The box filtering produces filtered alpha values at a rate of one filtered alpha value per pixel sub-component which, in the exemplary embodiment, is three alpha values per pixel, i.e., one for each of the R, G, and B pixel sub-components of a pixel.

The alpha values for the R, G and B pixel sub-components of two adjacent pixels 1034, 1036 are shown in row 1008. In row 1008, it can be seen that the R, G, B (filtered) alpha values for pixel 1034 are 2, 4, 4, respectively. In addition, it can be seen that the R, G, B alpha values for pixel 1038 are 2, 0, 0, respectively.

Figure 9:
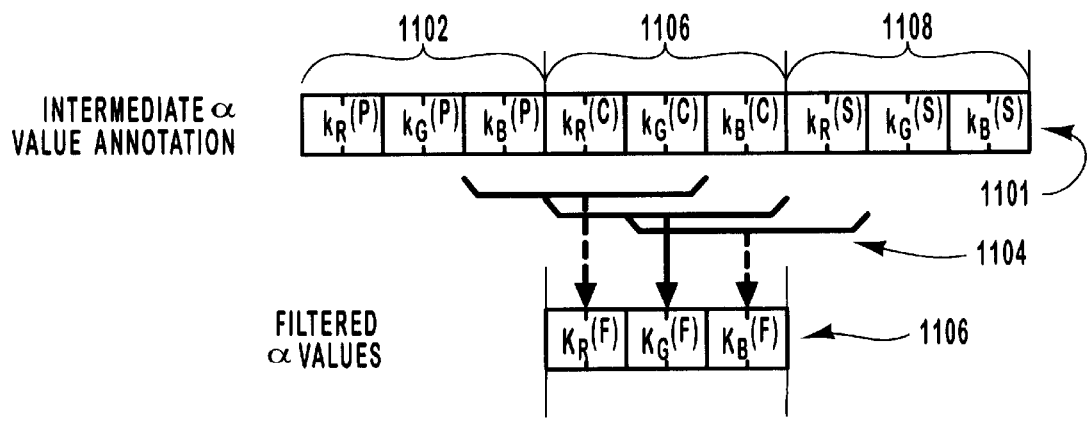
FIG. 9 illustrates utilized intermediate alpha value annotation and how intermediate alpha values relate to the filter output values produced from intermediate alpha values.

FIG. 9 illustrates in row 1101, intermediate alpha values corresponding to three source image pixel segments 1102, 1106, 1108. As discussed above, the three intermediate alpha values include a R, a G, and a B pixel sub-component intermediate alpha value, for each source image pixel segment.

FIG. 9 also illustrates, through the use of brackets generally indicated by the reference numeral 1104, block filtering performed to generate each of three filtered alpha values illustrated in row 1106. The three filtered alpha values include a R, a G and a B filtered alpha value corresponding to the red, green and blue pixel sub-components, respectively, of a current pixel.

Because of the implemented filtering, the filtered alpha values generated for each pixel depend on the intermediate alpha values corresponding to a current source image pixel segment, one intermediate alpha value from a preceding source image pixel segment and one intermediate alpha value from a subsequent source image pixel segment.

In FIG. 9, the small letter k is used to represent intermediate alpha values, while the large letter K is used to represent a filtered unnormalized alpha value. Subscripts R, G, and B are used to indicate the pixel sub-component to which the illustrated intermediate or filtered alpha value corresponds. The superscript (P) is used to indicate a value corresponding to a preceding source image pixel segment, the superscript (C) is used to indicate a value corresponding to a current source image pixel segment and the superscript (S) is used to indicate a value corresponding to a subsequent source image pixel segment. In addition, the superscript (F) is used to further indicate a filtered alpha value produced by the filtering operation of the present invention.

The filtering performed in accordance with the present invention may be expressed as follows:

$K_R^{(F)} = k_B^{(P)} + k_R^{(C)} + k_G^{(C)}$
$K_G^{(F)} = k_R^{(C)} + k_G^{(C)} + k_B^{(C)}$
$K_B^{(F)} = k_G^{(C)} + k_B^{(C)} + k_R^{(S)}$

Thus, in accordance with the present invention, the set of three filtered alpha values per pixel is generated from a set of 5 intermediate alpha values.

Given that there are a limited number (35) of possible input alpha value combinations, it is possible to pre-compute the set of filtered output values that will result from each set of possible intermediate alpha value coefficients. In one embodiment, the computations are made and the resulting filtered output values are stored in a look-up table which is used to implement the filtering operation of the present invention. Thus, the filtering computations need not be performed repeatedly in real time for each image being displayed.

Figure 10:
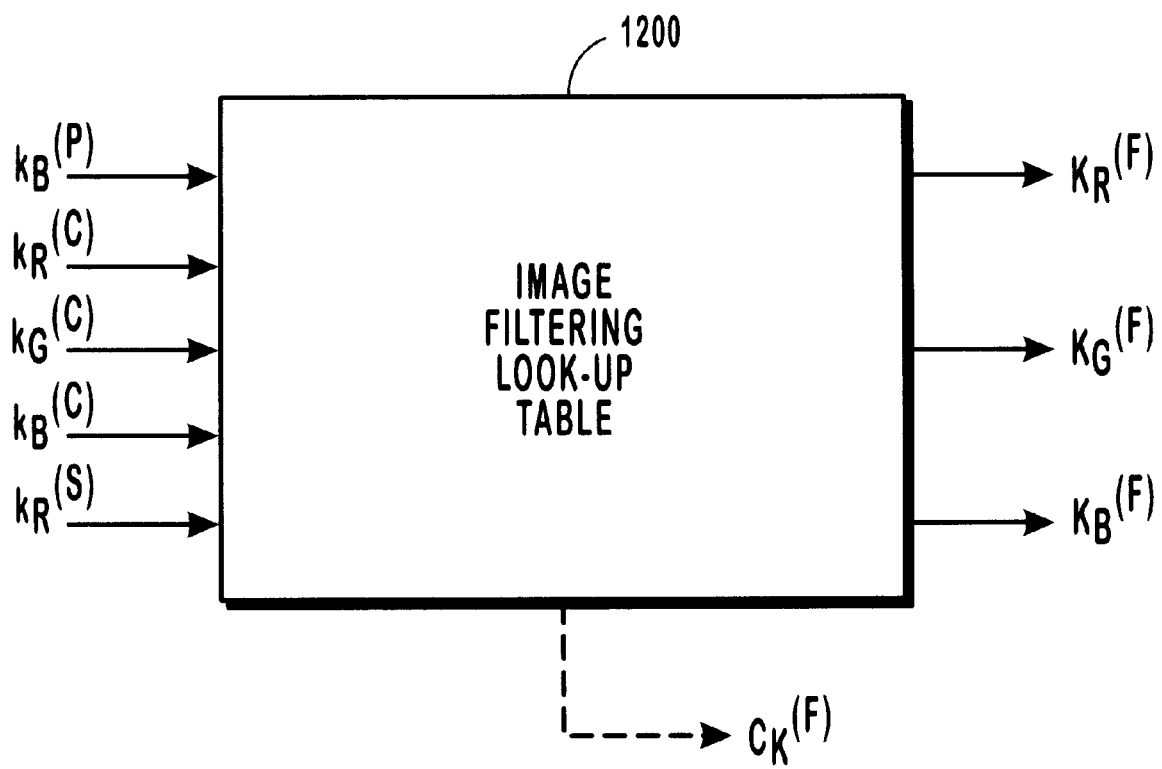
FIG. 10 illustrates an image filtering look-up table which can be used to perform a filtering operation in accordance with the present invention.

An image filtering look-up table 1200, implemented in accordance with the present invention, is illustrated in FIG. 10. The look-up table 1200 receives as its input the five intermediate alpha values ($k_B^{(P)}$, $k_R^{(C)}$, $k_G^{(C)}$, $k_B^{(C)}$, $k_R^{(S)}$) required to generate a set of R, G, and B filtered alpha values. The five input values are used as an index into the look-up table 1200 to locate a corresponding set of filtered alpha values ($K_R^{(F)}$, $K_G^{(F)}$, $K_B^{(F)}$) which are then output by the look-up table 1200.

Because the filtering operations used to generate the R, G and B filtered alpha values are not completely independent, only 115 different output combinations of filtered alpha values may occur. Accordingly, it is possible to represent a set of three filtered alpha values associated with a pixel as a single value in the range of 0–114. By using a value in the range of 0–114 to represent 3 filtered alpha values lossless data compression is achieved. Significantly, the values 0–114 can be represented using only 8 bits as opposed to 9 bits that would be needed to individually represent three district filtered alpha values each capable of assuming a value in the range 0–6. In embodiments which cache filtered alpha values, as will be discussed below, the 3 filtered alpha values for each pixel are represented in a compressed format as a number in the range of 0–114. Filtered alpha value compression and decompression can be implemented through the use of a look-up table. In fact, in embodiments where data compression is used, the image filtering look-up table may output a single value CK(F) representing, in compressed form, the 3 filtered alpha values $K_R^{(F)}$, $K_G^{(F)}$, $K_B^{(F)}$. The line exiting look-up table 1200 and terminating in the symbol $CK^{(F)}$ is shown using a dotted line to indicate that it is an alternative to the look-up table 1200 separately outputting 3 filtered alpha values.

II. Exemplary Computing and Software Environment

Figure 11:
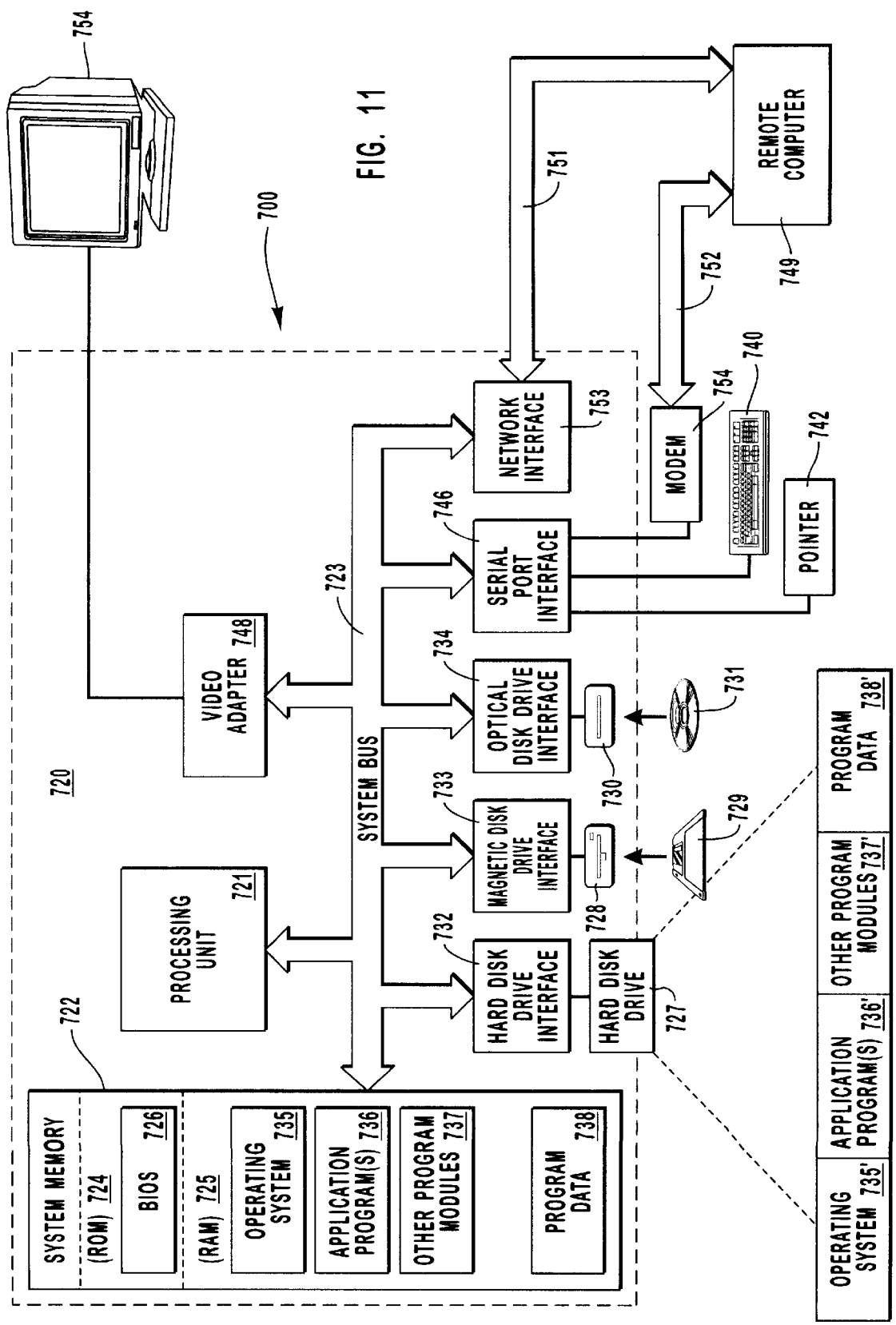
FIG. 11 illustrates a computer system of the present invention which implements the display methods and apparatus of the present invention.

FIG. 11 and the following discussion provide a brief, general description of an exemplary apparatus in which at least some aspects of the present invention, including the sampling and filtering illustrated in FIG. 6, may be implemented. Various methods of the present invention will be described in the general context of computer-executable instructions, e.g., program modules, being executed by a computer device such as a personal computer. Other aspects of the invention will be described in terms of physical hardware such as, e.g., display device components, image rendering hardware, and display screens.

The methods of the present invention may be affected by other apparatus than the specific described computer devices. Program modules may include routines, programs, objects, components, data structures, etc. that perform task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, displays used in, e.g., automotive, aeronautical, industrial applications, and the like. At least some aspects of the present invention may also be practiced in distributed computing environments where tasks are performed by remote processing devices linked through a communications network. In a distributed computing environment, program modules, routines and data, e.g., character font file, may be located in local and/or remote memory storage devices.

FIG. 11 illustrates an exemplary apparatus 700 for implementing at least some aspects of the present invention. The apparatus 700 includes a general purpose computing device, e.g., a portable personal computer 720. The personal computer 720 may include a processing unit 721, a system memory 722, and a system bus 723 that couples various system components including the system memory to the processing unit 721. The system bus 723 may be any of several types of bus structures including a memory bus or memory controller, a peripheral bus, and a 30 local bus using any of a variety of bus architectures. The system memory 722 may include read only memory (ROM) 724 and/or random access memory (RAM) 725. A basic input/output system 726 (BIOS), including basic routines that help to transfer information between elements within the personal computer 720, such as during start-up, may be stored in ROM 724. The personal computer 700 may also include a hard disk drive 727 for reading from and writing to a hard disk, (not shown), a magnetic disk drive 728 for reading from or writing to a (e.g., removable) magnetic disk 729, and an optical disk drive 730 for reading from or writing to a removable (magneto) optical disk 731 such as a compact disk or other (magneto) optical media. The hard disk drive 727, magnetic disk drive 728, and (magneto) optical disk drive 730 may be coupled with the system bus 723 by a hard disk drive interface 732, a magnetic disk drive interface 733, and a (magneto) optical drive interface 734, respectively. The drives and their associated storage media provide non-volatile storage of machine readable instructions, data structures, program modules and other data for the personal computer 720. Although the exemplary environment described herein employs a hard disk, a removable magnetic disk 729 and a removable optical disk 731, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 727, magnetic disk 728, (magneto) optical disk 731, ROM 724 or RAM 725, such as an operating system 735, one or more application programs 736, other program modules 737, and/or program data 738 for example. As will be discussed below, the operating system 735 may include character font files which include high resolution representations of characters and one or more gnat tables which include character stem width control information. A user may enter commands and information into the personal computer 720 through input devices, such as a keyboard 740 and pointing device 742 for example.

Additional input devices (not shown) such as a microphone, joystick, game pad, satellite dish, scanner, or the like may also be included. These and other input devices are often connected to the processing unit 721 through a serial port interface 746 coupled to the system bus. However, input devices may be connected by other interfaces, such as a parallel port, a game port or a universal serial bus (USB). Liquid crystal display device 754 or another type of display device, e.g., a CRT display, may also be connected to the system bus 723 via an interface, such as a video adapter 748 for example.

In addition to the display 754, the personal computer 720 may include other peripheral output devices (not shown), such as speakers and printers for example.

The personal computer 720 may operate in a networked environment which defines logical connections to one or more remote computers, such as a remote computer 749. The remote computer 749 may be another personal computer, a server, a router, a network PC, a peer device or other common network node, and may include many or all of the elements described above relative to the personal computer 720, although only a memory storage device 750 has been illustrated in FIG. 11. The logical connections depicted in FIG. 11 include a local area network (LAN) 751 and a wide area network (WAN) 752, an intranet and the Internet.

When used in a LAN, the personal computer 720 may be connected to the LAN 751 through a network interface adapter (or "NIC") 753. When used in a WAN, such as the Internet, the personal computer 720 may include a modem 754 or other means for establishing communications over the wide area network 752. The modem 754, which may be internal or external, may be connected to the system bus 723 via the serial port interface 746. In a networked environment, at least some of the program modules depicted relative to the personal computer 720 may be stored in a remote memory storage device. The network connections shown are exemplary and other means of establishing a communications link between the computers may be used.

Figure 12:
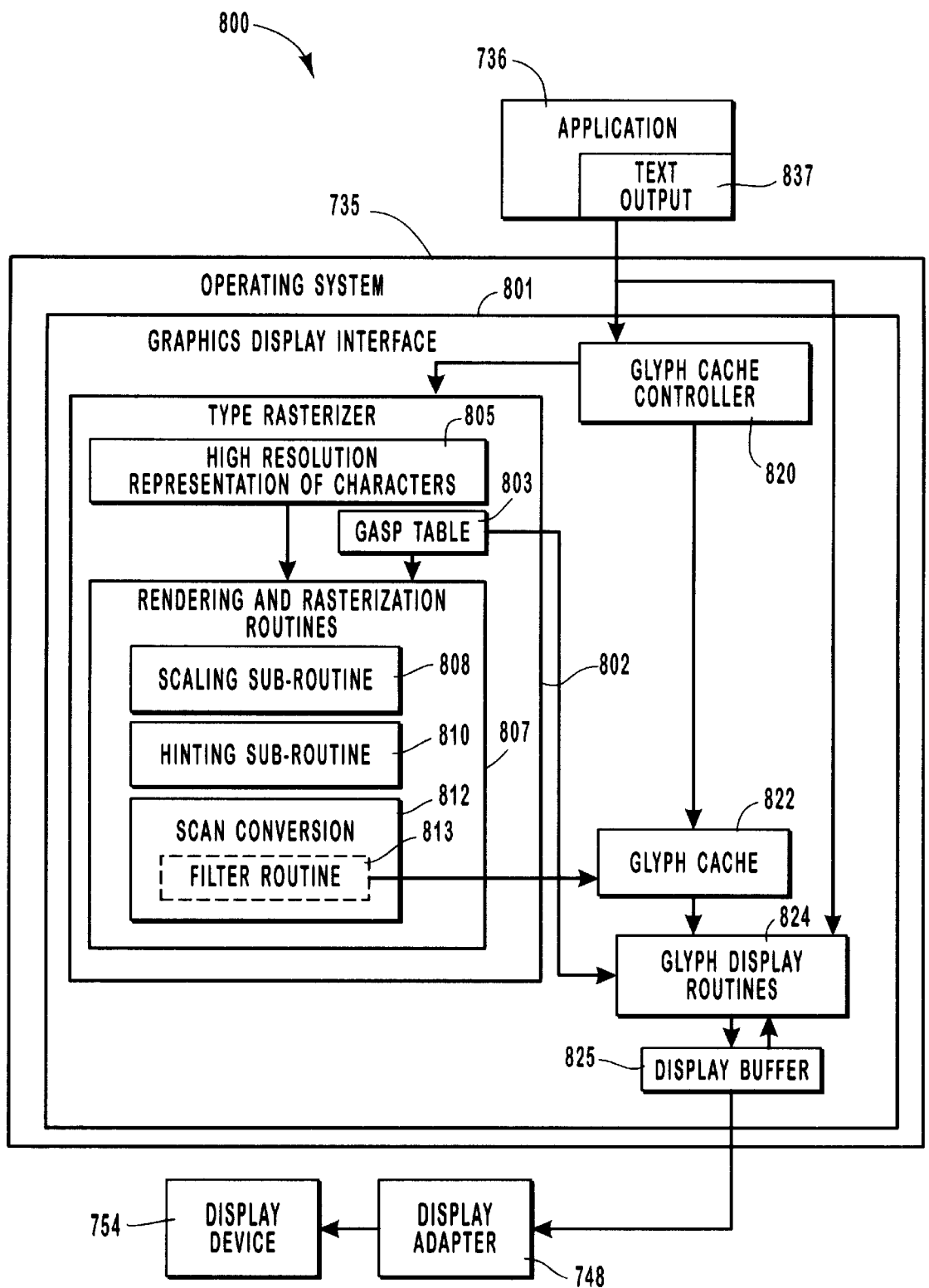
FIG. 12 illustrates various components of the computer system of FIG. 11 in greater detail.

FIG. 12 illustrates the relationship between various hardware and software components 800 including application program 736, operating system 735, video adapter 748 and display device 754, of the system 700.

In the illustrated embodiment, operating system 735 includes a graphics display interface (GDI) 801. The GDI 801 includes a glyph cache controller 820, type rasterizer 802, glyph cache 822, glyph display routines 824, and display buffer 825. The arrows leading to and from the display buffer 825 and glyph display routines 824 indicate that data can be written to and read from the display buffer 825.

The text output of application 837 includes information identifying the content of a text string, e.g., the sequence of characters included therein, in addition to character font and point size information. The text output information 837, generated by application 736, may also include character positioning information, e.g., angling or spacing information, and/or foreground/background color information. The character positioning information and/or foreground/background color information is supplied to the glyph display routines 824.

The glyph cache controller 820 is responsible for managing the content and output of the glyph cache 822. The glyph cache controller 820 receives the text output information 837 including the character, font and point size information. The controller 820 determines if a character to be displayed is already stored in the glyph cache 822.

If a character glyph corresponding to a character to displayed at a specified point size is already stored in the glyph cache 822, the glyph cache controller 820 controls the glyph cache 822 to output the corresponding character glyph. The character glyph is supplied to the glyph display routines 824, which are responsible for combining individual glyphs into a larger image for display purposes and applying foreground/background color selections.

However, if a character glyph corresponding to a character to be displayed at a specified point size is not already stored in the glyph cache 822, the glyph cache controller 820 provides the character, font and point size information to the type rasterizer 802.

The type rasterizer 802 is responsible for generating a character glyph from the received information.

The type rasterizer 802 includes a set of high resolution digital representations of characters 805; a GASP table 803, including character stem width control information; and a set of rendering and rasterization routines 807. The digital representation of characters 805 may include font files which include scalable outline representations of characters and character spacing information. The character outlines may be expressed in the form of lines, points, curves and/or arcs. Portions of a character within a character outline represent foreground image areas while portions outside the character outlines, e.g., the area between characters, represent background image areas.

The GASP table 803 includes information which indicates the display point size at which stem weights for a stored font should transition from one to two pixels in width. As will be discussed below, this table, in some embodiments, is used to determine which characters should have their stem widths increased, e.g., bloated, under certain conditions discussed below.

The set of rendering and rasterization routines 807 includes scaling, hinting and scan conversion subroutines 808, 810, 812 as well as a color compensation sub-routine 870.

Scaling sub-routine 808 is responsible for scaling the outline representations of the characters to be rendered. This is done, in accordance with the present invention, as a function of pixel pattern and/or direction of display striping. For example, in the exemplary embodiment, the outline representations of the characters to be rendered are scaled at a rate perpendicular to the direction of striping at a rate which is an integer multiple of the rate of scaling in the direction of striping.

Hinting sub-routine 810 is responsible for adjusting the shape and/or position of character outlines. Hinting is performed as a function of display device characteristics and takes into consideration the position, shape, type and/or arrangement of pixel sub-components which comprise the display 754.

Scan conversion sub-routine 812 is responsible for generating a bitmap representation, e.g., a character glyph, from the hinted outline representation produced by the hinting sub-routine 312. The scan conversion operation involves sampling the hinted outline image representation and then, optionally, filtering the sampled image values prior to storage in the glyph cache. An optional filter routine 813 is illustrated using dashed lines as part of the scaling routine 812. As will be discussed below, filtering 813 may be performed as part of the glyph display routines 824 when it is not performed prior to generated glyphs being placed in the glyph cache 822. In accordance with the present invention, character glyphs may be represented as sets of sampled alpha values or, alternatively, filtered alpha values corresponding to red, green and blue pixel sub-components of individual pixels. In addition to the alpha value information generated character glyphs may include character spacing information such as one or more side bearing points. In cases where filtering is applied prior to glyph caching, the three filtered alpha values per pixel may be stored in a compressed format.

The character glyphs generated by the type rasterizer 805 are stored in the glyph cache 822 prior to being output under the direction of the glyph cache controller 820. In this manner, the glyph cache serves as a repository for character glyphs.

The glyph display routines 824 are responsible for processing character glyphs output by the glyph cache 822. The routines 824 combine the received glyphs into larger images, e.g., images of text strings, and apply foreground/background color selections. The glyph display routines 824 may also filter all or parts of the larger image generated from the character glyphs, e.g., prior to the application of foreground/background color selections.

The glyph display routines 824 include different routines for processing opaque and transparent glyphs. In the case of opaque glyphs, foreground and background color selections are applied uniformly to the entire image being generated, i.e., set foreground and background colors are applied. In the case of transparent glyphs, a uniform foreground color is applied and a background image, e.g., a previously displayed image, is used to provide the background color.

In the case of transparent glyphs, background color information is normally obtained from the display buffer 825.

Through the application of foreground/background color selections, gamma correction processes and various filtering operations, the glyph display routines 824 generate R, G, B pixel sub-component luminous intensity values which represent the characters to be displayed. The generated R, G, B luminous intensity values are stored in the display buffer 825, in memory locations corresponding to the pixel sub-components of the display device 754, which are to be controlled by the stored values.

Periodically, the values stored in the display buffer 825 are supplied to the display adapter 748. The display adapter 748 processes the received luminous intensity values and converts them into a signal format which is supported by the display device 754. In response to receiving signals from the display adapter 748, the display device 754 displays the text characters corresponding to text output 837.

III. Bloating Low Contrast Character Stems

When the above described filtering and display techniques are applied to certain fonts having narrow character stems, such as, e.g., Courier New, the resulting displayed characters can appear gray, assuming black text on a white background and can appear without significant contrast. This is understandable given the filtering applied during the display process. Given the above described filtering process, if a character is very thin, e.g., ⅙ of a pixel wide at a particular scan line, then only one sample of the six times over-sampled scan-line will be "on", e.g., correspond to the foreground color. This sample, after the filtering, will produce alpha values that are no more than 1 (on a scale from 0–6). If the background is white and the foreground is black, the pixel representing the character will not be more than ⅙ gray. This can be hard to read. Accordingly, in the case of thin stemmed fonts, the improved resolution associated with treating pixel sub-components as independent luminous sources may make the characters thinner than is desirable.

One way to address this problem would be to re-design the gray fonts such as Courier New, to be thicker than they presently are. However, re-designing fonts requires a significant investment in font designer time which can be extremely expensive. Another disadvantage of changing the font sets is that while broadening the font stems may improve appearance on LCD displays, it may result in overly thick character stems on CRT displays where, depending on the character display implementation, pixel sub-components may not be treated as independent luminous intensity sources.

One feature of the present invention is directed to addressing the contrast problem associated with thin stemmed fonts which look pale gray when displayed on the screen without the need to re-design the fonts.

In order to enhance the contrast of fonts which tend to gray, it is desirable to slightly widen or "bloat" the foreground portions of character glyphs that are associated with the gray or font contrast problem mentioned above. Since the gray character font problem associated with thin-stemmed character fonts, such as Courier New, does not occur in the majority of fonts, it is desirable that the bloating of characters in accordance with the present invention be applied selectively.

In one embodiment, information in the GASP table 803, which indicates the point size at which character stem widths will increase from one pixel to two pixels in width, is used to determine which fonts should be subject to bloating in accordance with the present invention and which should be rendered without bloating. In one embodiment, the bloating is applied to all characters of a font which is subject to bloating.

Most fonts change stem widths from one to two pixels at point sizes in the range of 12–16 points. In the case of Courier New, a thin stem character font subject to the gray font problem discussed above, stem widths change from one pixel in width to two pixels in width at about a point size of 27 or 28 points. The large distinction in the character stem size transition points provides information which can be used to identify thin stemmed fonts which could benefit from the character bloating technique of the present invention and to distinguish fonts which might be adversely impacted by bloating.

In one particular exemplary embodiment, characters glyphs which correspond to character fonts with stem widths that transition from one to two pixels in size above a pre-selected threshold are subject to bloating while others are not. In one exemplary embodiment, the threshold is set to 20 points. Thus, characters which correspond to fonts which the GASP table 803 indicates are to transition from one to two pixel wide stems above the size of 20 points, e.g., Courier New, are subject to bloating while others are not.

Suitable rules for bloating portions of character glyphs, to which bloating is to be applied, are shown in table 1700 of FIG. 13. The illustrated rules are intended to be applied to intermediate alpha values which have been generated by originally over-sampling each source image pixel segment by a factor of 6 and then summing pairs of samples to produce 3 intermediate alpha values per source pixel segment. The left side of table 1700 illustrates input intermediate alpha values and, in some cases a condition associated with an input alpha value. The right side of table 1700 illustrates the intermediate alpha value to be substituted for the intermediate alpha value shown on the left, provided that the condition, if any, associated with the input alpha value is satisfied.

Intermediate alpha values to the exemplary bloating step of the present invention may assume the values of 0, 1, or 2. Based on the rules illustrated in table 1700, intermediate input alpha values to the bloating step of the present invention of 1 and 2 result in an output intermediate alpha value of 2. Intermediate input alpha values of 0 when located next to an intermediate alpha value of 2 result in a output intermediate alpha value of 1. In addition, intermediate input alpha values of 0 when NOT located next to an intermediate alpha value of 2 result in a output intermediate alpha value of 0.

Figure 14:
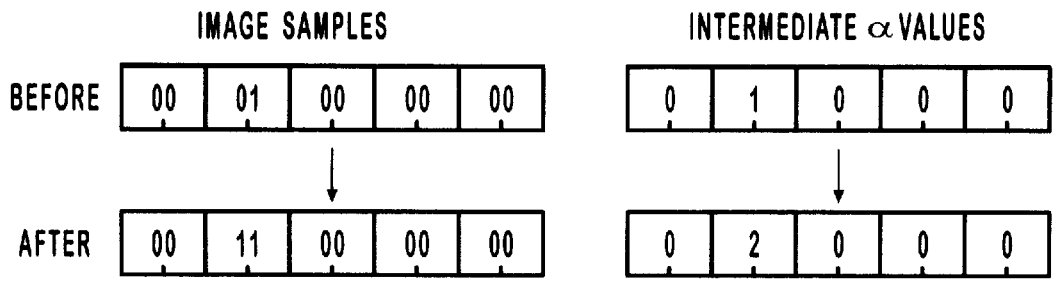
FIGS. 14–16 illustrate the effect of the image bloating rules included in the table of FIG. 13 on various sets of input data.
Figure 15:
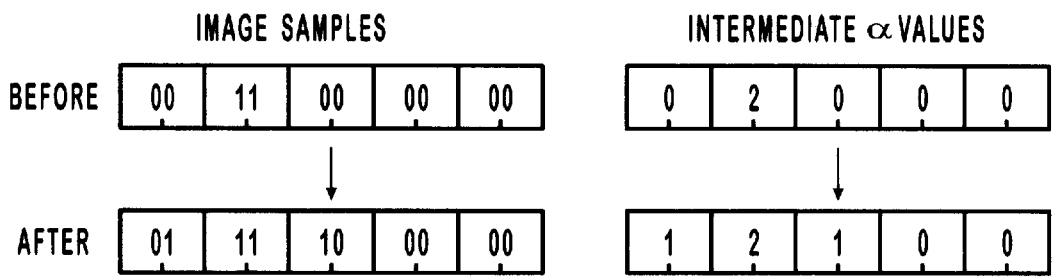
Figure 16:
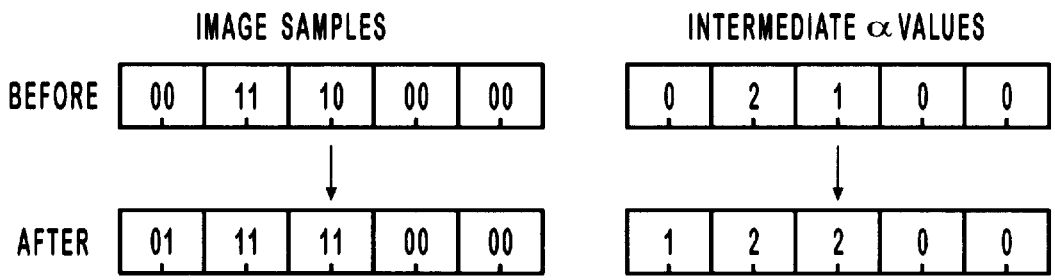

FIGS. 14–16 illustrate the application of the bloating rules of the present invention to various exemplary input sets of image samples and intermediate alpha values. On the left side of each of FIGS. 14–16 the application of the bloating rules to an input set of image samples, six per source pixel segment and the resulting processed images samples are shown. On the right side of each of FIGS. 14–16 the application of the bloating rules to an input set of intermediate alpha values, each alpha value representing the sum of two image samples, is shown. The input alpha values is shown at the top right-hand portion of each of the figures and the intermediate alpha values resulting from the application of the bloating rules is shown on the lower right-hand side of each of FIGS. 14–16. It can be readily seen in the examples of FIGS. 14–16 that the bloating technique adds approximately ⅙ of the pixel width to the vertical stem width on each side of the stem or, in other words, it adds a total of ⅓ of the pixel width to the stem width.

Figure 17:
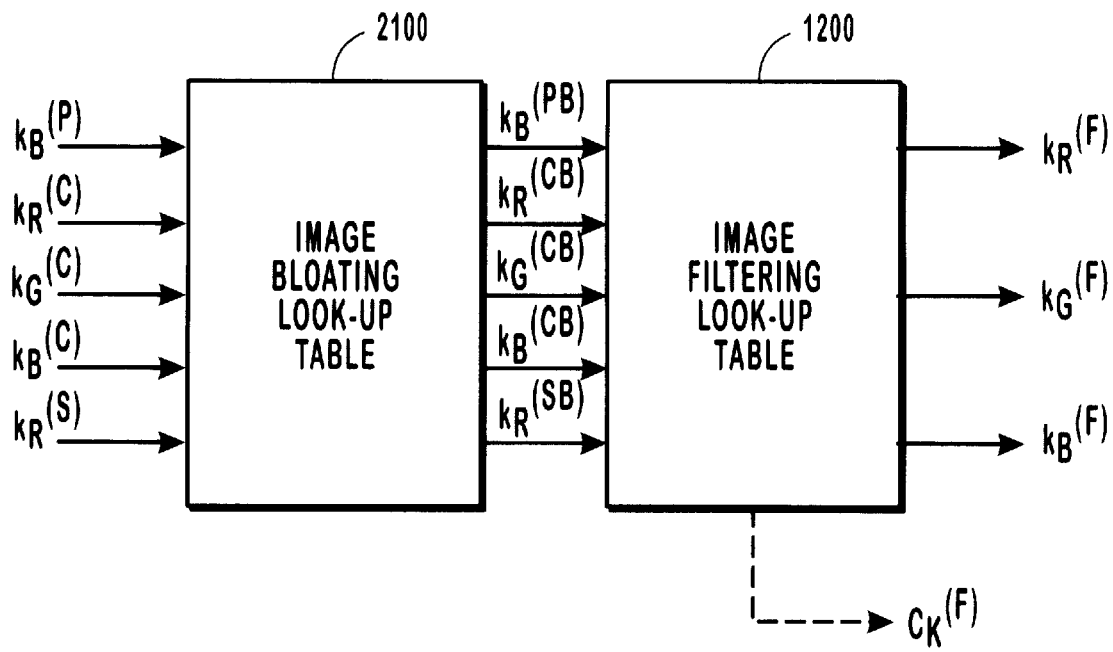
FIG. 17 illustrates how the application of the image bloating rules of the present invention and the image filtering operations of the present invention can be implemented through the use of successive look-up tables.

The bloating rules illustrated in table 1700 may be implemented using a look-up table. FIG. 17 illustrates an image bloating look-up table 2100 which outputs intermediate alpha values resulting from applying the above bloating rules, through a look-up operation, to input intermediate alpha values. The look-up table 2100 is generated by applying the image bloating rules of table 2100 to each possible set of intermediate alpha values which may be input to the table 2100. The resulting sets of processed intermediate alpha values, one for each possible input set of alpha values, are stored in the table 2100. Thus, there is one corresponding set of processed alpha values stored in the look-up table 2100 for each possible set of input intermediate alpha values. In response to the receipt of an input set of intermediate alpha values, the corresponding stored set of processed alpha values is output by the image bloating look-up table 2100.

The intermediate alpha values generated by the image bloating look-up table 2100 can subsequently be filtered to produce a set of filtered alpha values, e.g., at a rate of 3 per pixel. The filtering operation may be implemented using an image filtering look-up table 1200 which produces filtered alpha values in response to the input of intermediate alpha values. In FIG. 17, the letter B included in the superscript of the input intermediate alpha values supplied to filter table 1200 indicates the input alpha values have been processed according to the bloating rules of FIG. 13.

For fonts which are not subject to bloating, the image bloating table 2100 may be bypassed and the intermediate alpha values supplied directly to image filtering look-up table 1200.

Figure 18:
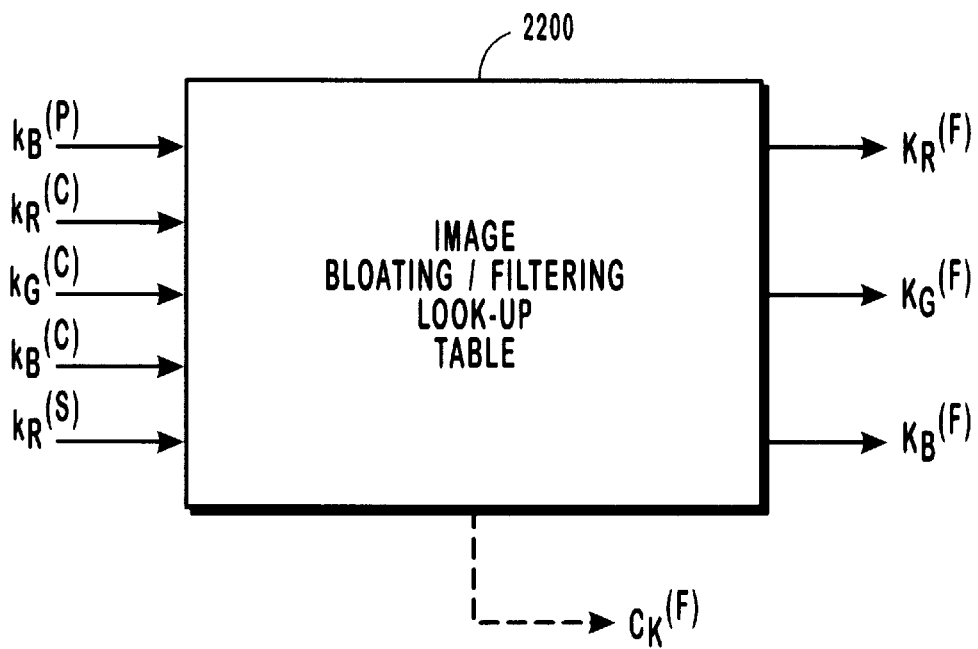
FIG. 18 illustrates how the application of image bloating rules and image filtering can be performed using a single look-up table.

Rather than use two sequential look-up tables, it is possible to combine the operation of the image bloating look-up table 2100 and the image filtering look-up table 1200 into a single image bloating and filtering look-up table 2200 as illustrated in FIG. 18. The image bloating and filtering look-up table 2200 applies performs both image bloating operations and filtering operations as part of a single look-up operation.

In one such embodiment, an image filtering look-up table 1200 is used to filter intermediate alpha values for fonts which are not subject to bloating while an image bloating/filtering look-up table 2200 is used to process intermediate alpha values corresponding to character glyphs subject to bloating.

Because the look-up table 2200 allows bloating and filtering operations to be performed in a single look-up operation, the processing required at display time to perform the bloating operation in addition to the filtering operation requires no more processing than performing the filtering operation alone. Accordingly, use of the combined bloating and filtering table of the present invention 2200 provides an easy and efficient way to adjust the weight of character fonts without having to modify the font or the hinting process associated therewith.

IV. Pre- and Post-Cache Glyph Filtering

The invention can also be practiced in combination with a first filtering embodiment which involves the application of the above described filtering subsequent to the caching of character glyphs or a second filtering embodiment supporting filtering of glyphs prior to the caching of character glyphs.

The first filtering embodiment involves performing the intermediate alpha value filtering discussed above, subsequent to the output of glyphs from a glyph cache and the combining, e.g., concatenation, of glyphs to form larger images, e.g., text strings. In such post cache filtering embodiments, glyphs are represented in the glyph cache as intermediate alpha value information. In the post cache filtering embodiment color leakage across glyph boundaries does not present a problem at filtering time. This is because, in such embodiments, glyphs are represented using intermediate alpha value information and are concatenated prior to filtering. Thus, by the time filtering is performed, the intermediate alpha values located adjacent glyph boundaries are defined and available for use during the filtering process.

The second filtering embodiment of the present invention supports filtering of glyphs prior to caching. In such embodiments, since glyphs are filtered prior to caching, filtered alpha value information is stored in the glyph cache in compressed or uncompressed form, as opposed to intermediate alpha value information. Notably, the intermediate alpha value filtering of the present invention is color independent since it is performed in the alpha space prior to the application of foreground/background colors. Accordingly, filtering need not be repeated even if the utilized foreground/background colors are changed. This fact, combined with the glyph edge padding and post cache processing techniques of the present invention, discussed below, allow pre-glyph cache glyph filtering to be employed.

Pre-cache glyph filtering has several advantages over post-cache filtering. First, filtering of the entire character glyph is not repeated each time the character glyph is incorporated into a new text string. Thus, processing requirements are reduced as compared to systems which filter entire images formed from cached glyphs each time a new image is generated. Second, when text is rendered at an angle, the entire image which includes the angled text, need not be filtered. Thus, processing can be reduced by eliminating the need to filter non-text background portion of images which include angled text.

Both the pre- and post-cache glyph filtering embodiments are described in more detail in U.S. patent application Ser. No. 09/364,647, entitled "Method and Apparatus for Filtering and Caching Data Representing Images," and filed Jul. 30, 1999, which has been incorporated herein by reference. U.S. patent application Ser. No. 09/364,647 also discloses filtering in association with the invention for opaque and transparent glyphs.

In view of the description of the invention included herein, numerous additional embodiments and variations on the discussed embodiments of the present invention will be apparent to one of ordinary skill in the art. It is to be understood that such embodiments do not depart from the present invention and are to be considered within the scope of the invention.

What is claimed and desired to be secured by United States Letters Patent is:

1. In a processing system having a display device on which images are displayed, the display device having a plurality of pixels each having a plurality of pixel sub-components of different colors, a method of effectively adjusting a dimension of a character feature so as to increase the contrast of the character feature when displayed on the display device, the method comprising the steps for:
   determining that a character would be displayed with a feature having an unacceptably low contrast in the absence of performing a compensation operation on image data that includes the character and in which characters are represented by a foreground color and a background color;
   oversampling the image data and filtering the resulting samples to generate alpha values that are associated with a set of adjacent pixel sub-components and correspond to the feature of the character; and
   based on the result of the step for determining, performing the compensation operation, including adjusting at least one of the alpha values so as to increase the apparent contrast between the foreground color and the background color when the character is displayed on the display device.

2. A method as recited in claim 1, wherein the step for determining that the character would be displayed with a feature having an unacceptably low contrast comprises the act of identifying a font to which the character belongs.

3. A method as recited in claim 2, wherein the step for determining that the character would be displayed with a feature having an unacceptably low contrast further comprises the act of determining whether a pixel size at which a stem width of the character transitions from one pixel in width to two pixels in width is greater than a pre-selected pixel size threshold.

4. A method as recited in claim 1, wherein the step for determining that the character would be displayed with a feature having an unacceptably low contrast comprises the act of examining the width of a stem of the character.

5. A method as recited in claim 1, further comprising the step for displaying the character on the display device by separately controlling the pixel sub-components of the pixels using alpha values that correspond thereto, at least one of the pixel sub-components being controlled using the at least one alpha value that has been adjusted in the compensation operation.

6. A method as recited in claim 1, further comprising the step for displaying the character on the display device using the alpha values, resulting in each of the pixel sub-components of a particular pixel, rather than entire pixels, representing a different portion of the character.

7. A method as recited in claim 1, wherein the step for adjusting at least one of the alpha values comprises the act of using the at least one alpha value as an index to a look-up table and obtaining an adjusted alpha value from the look-up table.

8. A method as recited in claim 1, further comprising, after the step for adjusting, the step for caching the alpha values, including the at least one alpha value that has been adjusted, in a font glyph cache for later use in assembling an image to be displayed on the display device.

9. In a processing system having a display device on which images are displayed, the display device having a plurality of pixels each having a plurality of pixel sub-components of different colors, a method of effectively adjusting a dimension of a character feature so as to increase the contrast of the character feature when displayed on the display device, the method comprising the acts of:

oversampling image data in which the character is represented by a foreground color and a background color by obtaining multiple samples of the image data for each of the pixel sub-components of a particular pixel;

filtering the multiple samples to obtain alpha values for each of the pixel sub-components of the particular pixel, the value of the each of the alpha values corresponding to the number of corresponding multiple samples that are associated with the foreground color;

adjusting at least one of the alpha values to effectively increase the number of corresponding multiple samples that are associated with the foreground color; and using the alpha values, including the at least one adjusted alpha value, to display the character on the display device.

10. A method as recited in claim 9, further comprising the act of determining that the character belongs to a font in which a pixel size at which stem widths of characters transition from one pixel in width to two pixels in width is greater than a pre-selected pixel size threshold, wherein the act of adjusting at least one of the alpha values is conducted based on the act of determining.

11. A method as recited in claim 10, wherein the character belongs to a Courier New font.

12. A method as recited in claim 9, wherein the act of adjusting at least one of the alpha values comprises the act of using the alpha value as an index to a look-up table and obtaining an adjusted alpha value from the look-up table.

13. A method as recited in claim 9, wherein the act of adjusting at least one of the alpha values comprises the acts of:

determining that some but fewer than all of the multiple samples corresponding to a particular pixel sub-component are associated with the foreground color; and based on the act of determining, adjusting the alpha value of said particular pixel sub-component such that all of the multiple samples corresponding to the particular pixel sub-component become effectively associated with the foreground color.

14. A method as recited in claim 9, wherein the act of adjusting at least one of the alpha values comprises the acts of:

determining that none of the multiple samples corresponding to a particular pixel sub-component are associated with the foreground color and that all of the multiple samples corresponding to a pixel sub-component adjacent to the particular pixel-sub-component are associated with the foreground color; and based on the act of determining, adjusting the alpha value of said particular pixel sub-component such that at least some of the multiple samples corresponding to the particular pixel sub-component become effectively associated with the foreground color.

15. In a processing system having a display device on which images are displayed, the display device having a plurality of pixels each having a plurality of pixel sub-components of different colors, a method of effectively adjusting a dimension of a character feature so as to increase the contrast of the character feature when displayed on the display device, the method comprising the acts of:

providing, at a data storage medium at the processing system, a look-up table for converting sets of input alpha values associated with individual pixel sub-components of a pixel to sets of output alpha values used to control the pixel sub-components;

indexing the look-up table using a set of input alpha values that includes input alpha values associated with the pixel sub-components of a particular pixel, the set of input alpha values having been generated by mapping multiple samples of image data that defines a character to each of the pixel sub-component of the particular pixel, the set of input alpha values including:

an input alpha value obtained from at least one sample of the image data corresponding to a red pixel sub-component of the particular pixel;

an input alpha value obtained from at least one sample of the image data corresponding to a green pixel sub-component of the particular pixel;

an input alpha value obtained from at least one sample of the image data corresponding to a blue pixel sub-component of the particular pixel; and at least one other input alpha value obtained from at least one sample of the image data corresponding to a pixel sub-component of another pixel adjacent to the particular pixel; and generating, from the look-up table, a set of output alpha values that are associated with the pixel sub-components of the particular pixel, the set of output alpha values effectively increasing the dimension of a character feature of the character.

16. A method as recited in claim 15, wherein the character feature is a stem, the method further comprising the step for determining that the stem would otherwise be displayed with an unacceptably low contrast in the absence of the act of generating the set of output alpha values, wherein the act of indexing the look-up table is performed based on said determination.

17. A method as recited in claim 15, wherein the character is defined in the image data by a foreground color and a background color.

18. A method as recited in claim 17, wherein, when the set of input index values includes a particular input alpha value that indicates that some but fewer than all of the multiple samples corresponding to a particular pixel sub-component are associated with the foreground color:

the output alpha value corresponding to the particular input alpha value is selected such that all of the multiple samples corresponding to the particular pixel sub-component become effectively associated with the foreground color.

19. A method as recited in claim 17, wherein, when the set of input index values includes a particular input alpha value that indicates that none of the multiple samples corresponding to a particular pixel sub-component are associated with the foreground color and all of the multiple samples corresponding to a pixel sub-component adjacent to the particular pixel sub-component are associated with the foreground color:

the output alpha value corresponding to the particular input alpha value is selected such that at least some of the multiple samples corresponding to the particular pixel sub-component become effectively associated with the foreground color.

20. A method as recited in claim 15, wherein the at least one other input alpha value includes:

an input alpha value obtained from at least one sample of the image data corresponding to a blue pixel sub-component in a first pixel adjacent to the particular pixel; and an input alpha value obtained from at least one sample of the image data corresponding to a red pixel sub-component in a second pixel adjacent to the particular pixel.

21. A computer program product for implementing, in a processing system having a display device on which images are displayed, the display device having a plurality of pixels each having a plurality of pixel sub-components of different colors, a method of effectively adjusting a dimension of a character feature so as to increase the contrast of the character feature when displayed on the display device, the computer program product comprising:

a computer-readable medium carrying executable instructions for performing the method, wherein the method includes the steps of:

determining that a character would be displayed with a feature having an unacceptably low contrast in the absence of performing a compensation operation on image data that includes the character and in which characters are represented by a foreground color and a background color;

oversampling the image data and filtering the resulting samples to generate alpha values that are associated with a set of adjacent pixel sub-components and correspond to the feature of the character; and based on the result of the step of determining, performing the compensation operation, including adjusting at least one of the alpha values so as to increase the apparent contrast between the foreground color and the background color when the character is displayed on the display device.

22. A computer program product as recited in claim 21, wherein the step for determining that the character would be displayed with a feature having an unacceptably low contrast comprises the act of identifying a font to which the character belongs.

23. A computer program product as recited in claim 22, wherein the step for determining that the character would be displayed with a feature having an unacceptably low contrast further comprises the act of determining whether a pixel size at which a stem width of the character transitions from one pixel in width to two pixels in width is greater than a pre-selected pixel size threshold.

24. A computer program product as recited in claim 21, wherein the method performed by the executable instructions further comprises the step for displaying the character on the display device by separately controlling the pixel sub-components of the pixels using alpha values that correspond thereto, at least one of the pixel sub-components being controlled using the at least one alpha value that has been adjusted in the compensation operation.

25. A computer program product as recited in claim 21, wherein the step for adjusting at least one of the alpha values comprises the act of using the alpha value as an index to a look-up table and obtaining an adjusted alpha value from the look-up table.

26. A computer program product as recited in claim 21, wherein the method performed by the executable instructions further comprises, after the step for adjusting, the step for caching the alpha values, including the at least one alpha value that has been adjusted, in a font glyph cache for later use in assembling an image to be displayed on the display device.

27. A computer program product as recited in claim 21, wherein the step for adjusting at least one of the alpha values comprises the acts of:

determining that some but fewer than all of multiple samples that have been obtained in the step for oversampling and which are mapped to a particular pixel sub-component are associated with the foreground color; and based on the act of determining, adjusting the alpha value associated with said particular pixel sub-component such that all of said multiple samples become effectively associated with the foreground color.

28. A method as recited in claim 21, wherein the step for adjusting at least one of the alpha values comprises the acts of:

determining that none of multiple samples that have been obtained in the step for oversampling and which are mapped to a particular pixel sub-component are associated with the foreground color and that all of multiple samples that are mapped to a pixel sub-component adjacent to the particular pixel-subcomponent are associated with the foreground color; and based on the act of determining, adjusting the alpha value associated with said particular pixel sub-component such that at least some of the multiple samples mapped to the particular pixel sub-component become effectively associated with the foreground color.

29. A system for displaying an image, comprising:

a processing unit;

a display device having a plurality of pixels, each pixel including a plurality of pixel sub-components each of a different color; and a computer program product including a computer-readable medium carrying executable instructions that, when executed by the processing unit, enable the system to perform a method of effectively adjusting a dimension of a character feature so as to increase the contrast of the character feature when displayed on the display device, the method comprising the acts of:

oversampling image data in which the character is represented by a foreground color and a background color by obtaining multiple samples of the image data for each of the pixel sub-components of a particular pixel;

filtering the multiple samples to obtain alpha values for each of the pixel sub-components of the particular pixel, the value of the each of the alpha values corresponding to the number of corresponding multiple samples that are associated with the foreground color;

adjusting at least one of the alpha values to effectively increase the number of corresponding multiple samples that are associated with the foreground color; and using the alpha values, including the at least one adjusted alpha value, to display the character on the display device.

30. A system as recited in claim 29, wherein the method further comprises the act of determining that the character belongs to a font in which a pixel size at which stem widths of characters transition from one pixel in width to two pixels in width is greater than a pre-selected pixel size threshold, wherein the act of adjusting at least one of the alpha values is conducted based on the act of determining.

31. A system as recited in claim 30, wherein the character belongs to a Courier New font.

32. A system as recited in claim 29, wherein the act of adjusting at least one of the alpha values comprises the act of using the alpha value as an index to a look-up table and obtaining an adjusted alpha value from the look-up table.

33. A system as recited in claim 29, wherein the act of adjusting at least one of the alpha values comprises the acts of:
    determining that some but fewer than all of the multiple samples corresponding to a particular pixel sub-component are associated with the foreground color; and
    based on the act of determining, adjusting the alpha value of said particular pixel sub-component such that all of the multiple samples corresponding to the particular pixel sub-component become effectively associated with the foreground color.

34. A system as recited in claim 29, wherein the act of adjusting at least one of the alpha values comprises the acts of:
    determining that none of the multiple samples corresponding to a particular pixel sub-component are associated with the foreground color and that all of the multiple samples corresponding to a pixel sub-component adjacent to the particular pixel-subcomponent are associated with the foreground color; and
    based on the act of determining, adjusting the alpha value of said particular pixel sub-component such that at least some of the multiple samples corresponding to the particular pixel sub-component become effectively associated with the foreground color.

35. In a processing system having a display device on which images are displayed, the display device having a plurality of pixels each having a plurality of pixel sub-components of different colors, a method of effectively adjusting a dimension of a stem of a character so as to increase the contrast of the stem when displayed on the display device, the method comprising the acts of:
    providing, at a data storage medium at the processing system, a look-up table for converting sets of input alpha values associated with individual pixel sub-components of a pixel to sets of output alpha values used to control the pixel sub-components;
    determining that the stem would otherwise be displayed with an unacceptably low contrast in the absence of generating a set of alpha values from the look-up table that effectively increase the dimension of the stem;
    based on said determination, indexing the look-up table using a set of input alpha values that includes input alpha values associated with the pixel sub-components of a particular pixel, the set of input alpha values having been generated by mapping multiple samples of image data that defines a character to each of the pixel sub-component of the particular pixel, the set of input alpha values including:
        an input alpha value for a red pixel sub-component of the particular pixel;
        an input alpha value for a green pixel sub-component of the particular pixel; and
        an input alpha value for a blue pixel sub-component of the particular pixel; and
    generating, from the look-up table, the set of output alpha values that are associated with the pixel sub-components of the particular pixel, the set of output alpha values effectively increasing the dimension of the stem the character.

* * * * *